Jan. 2, 1951  R. L. PALMER ET AL  2,536,955
ELECTRONIC ACCOUNTING MACHINE
Filed Dec. 27, 1944  8 Sheets-Sheet 1
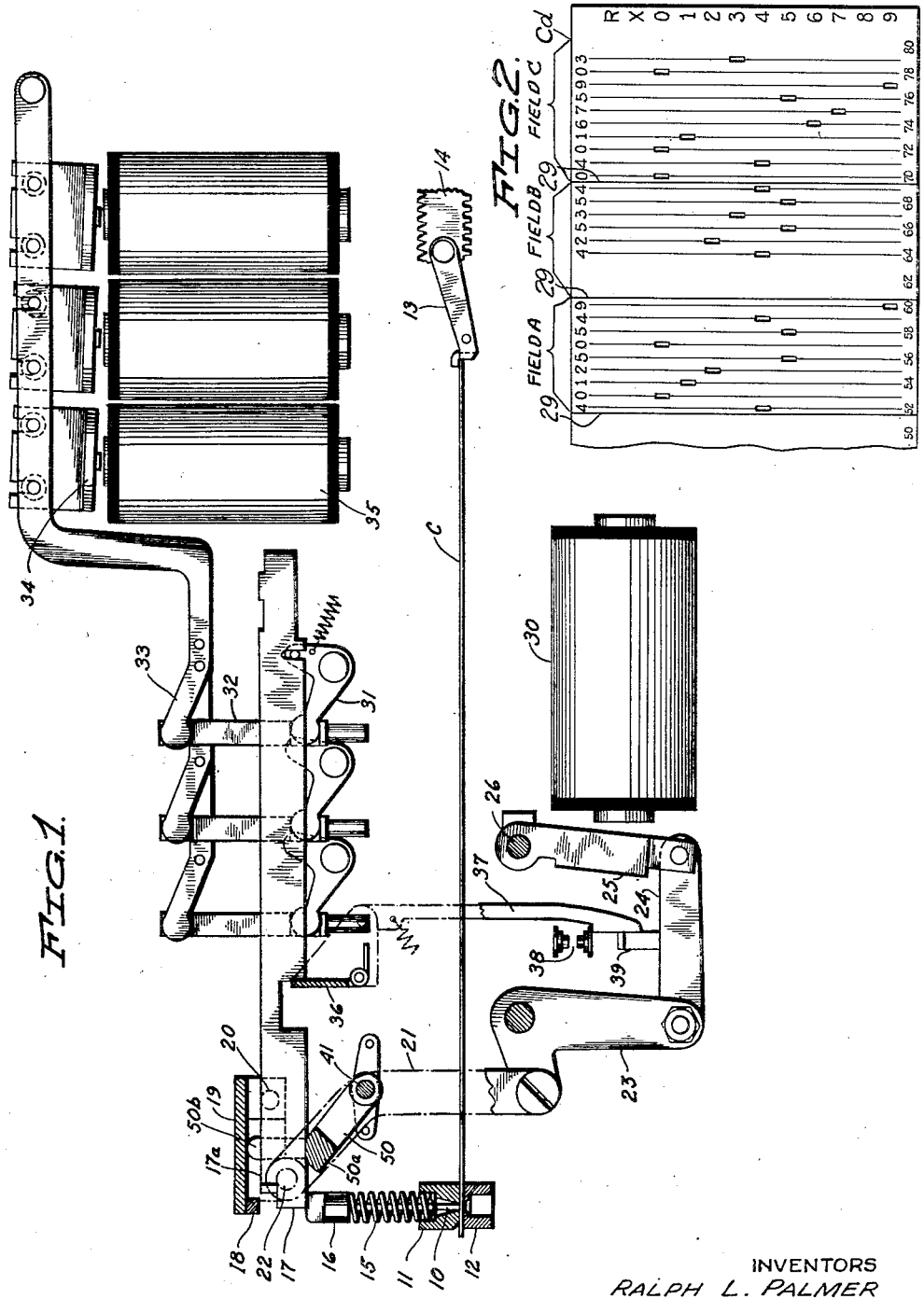
INVENTORS
RALPH L. PALMER
BYRON E. PHELPS
BY
ATTORNEY Jan. 2, 1951 — R. L. PALMER ET AL — 2,536,955
ELECTRONIC ACCOUNTING MACHINE
Filed Dec. 27, 1944 — 8 Sheets-Sheet 2
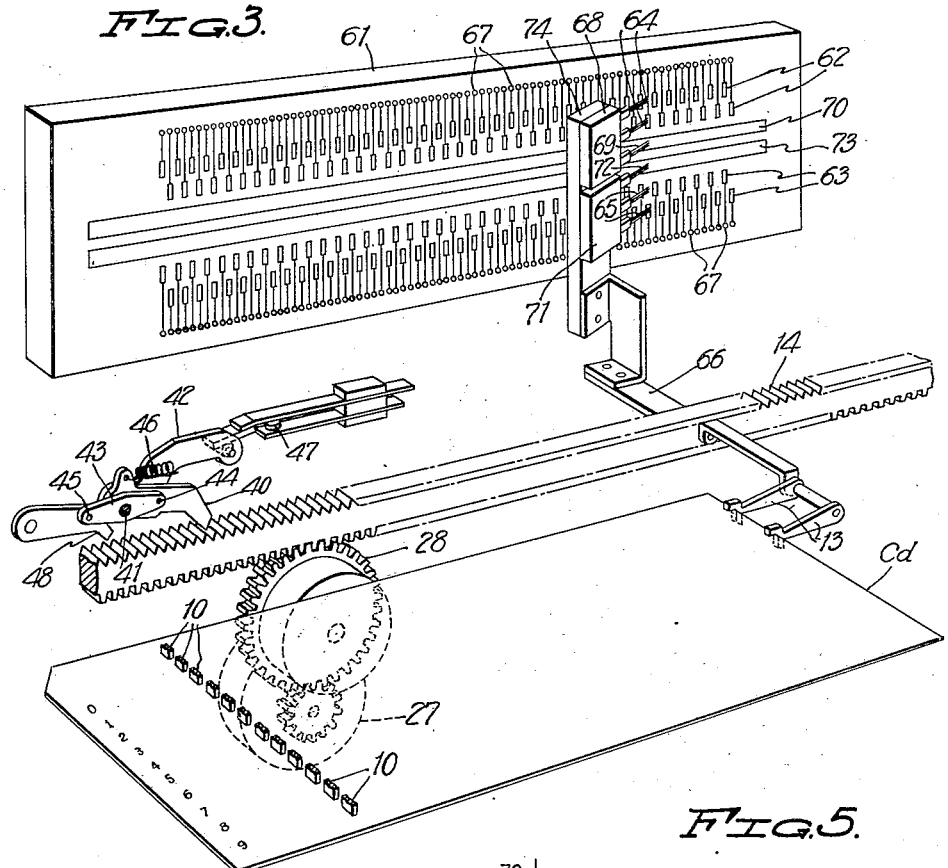
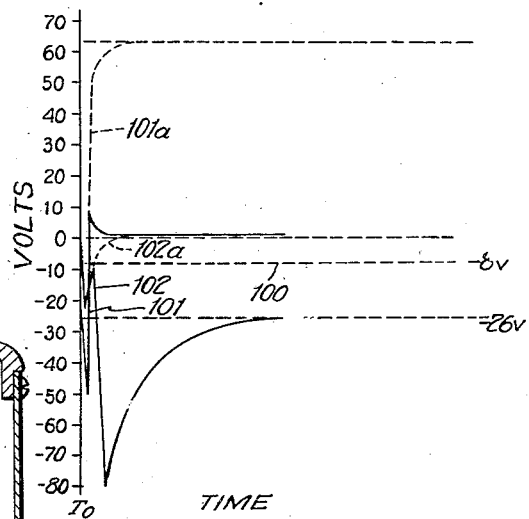
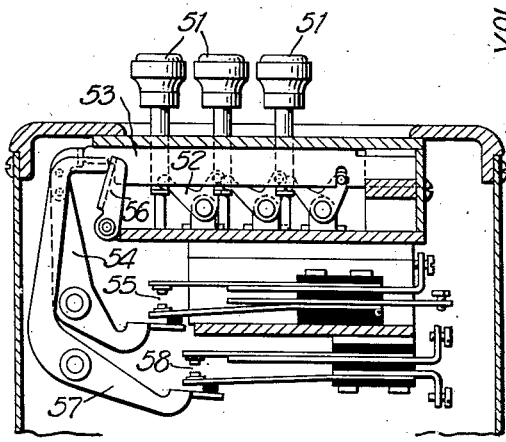
INVENTORS
RALPH L. PALMER
BYRON E. PHELPS
BY
ATTORNEY

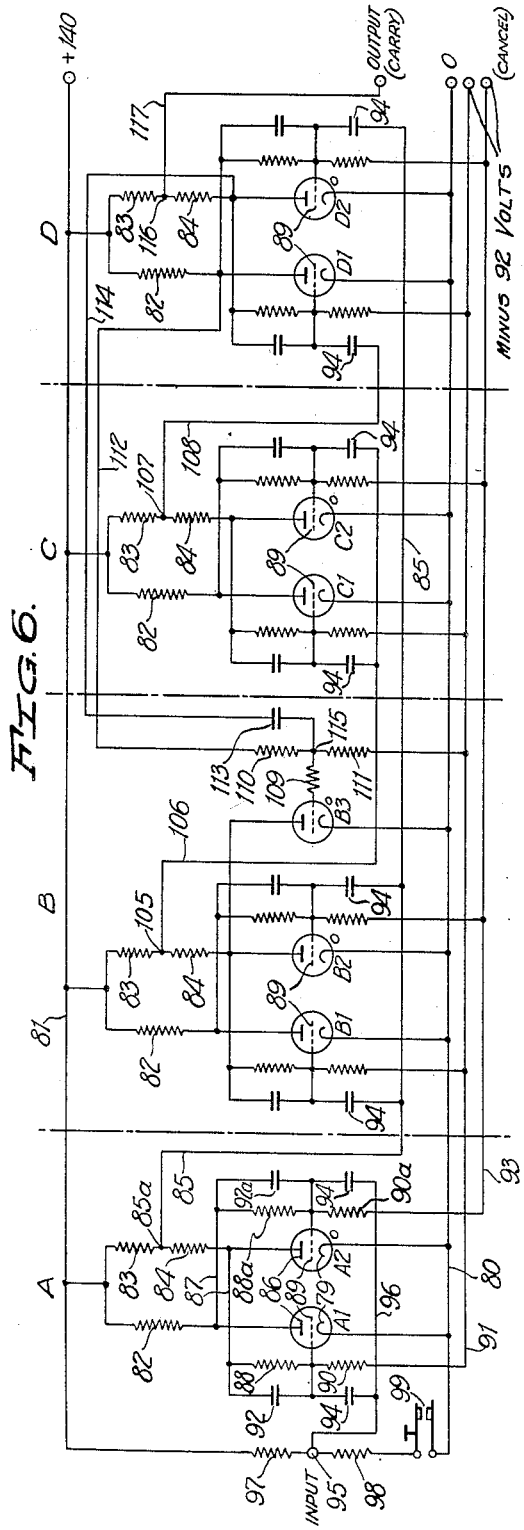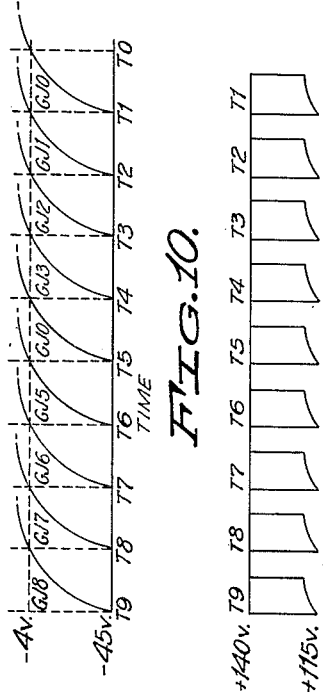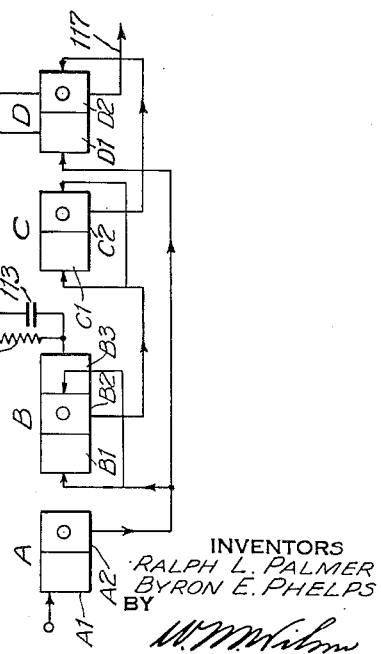

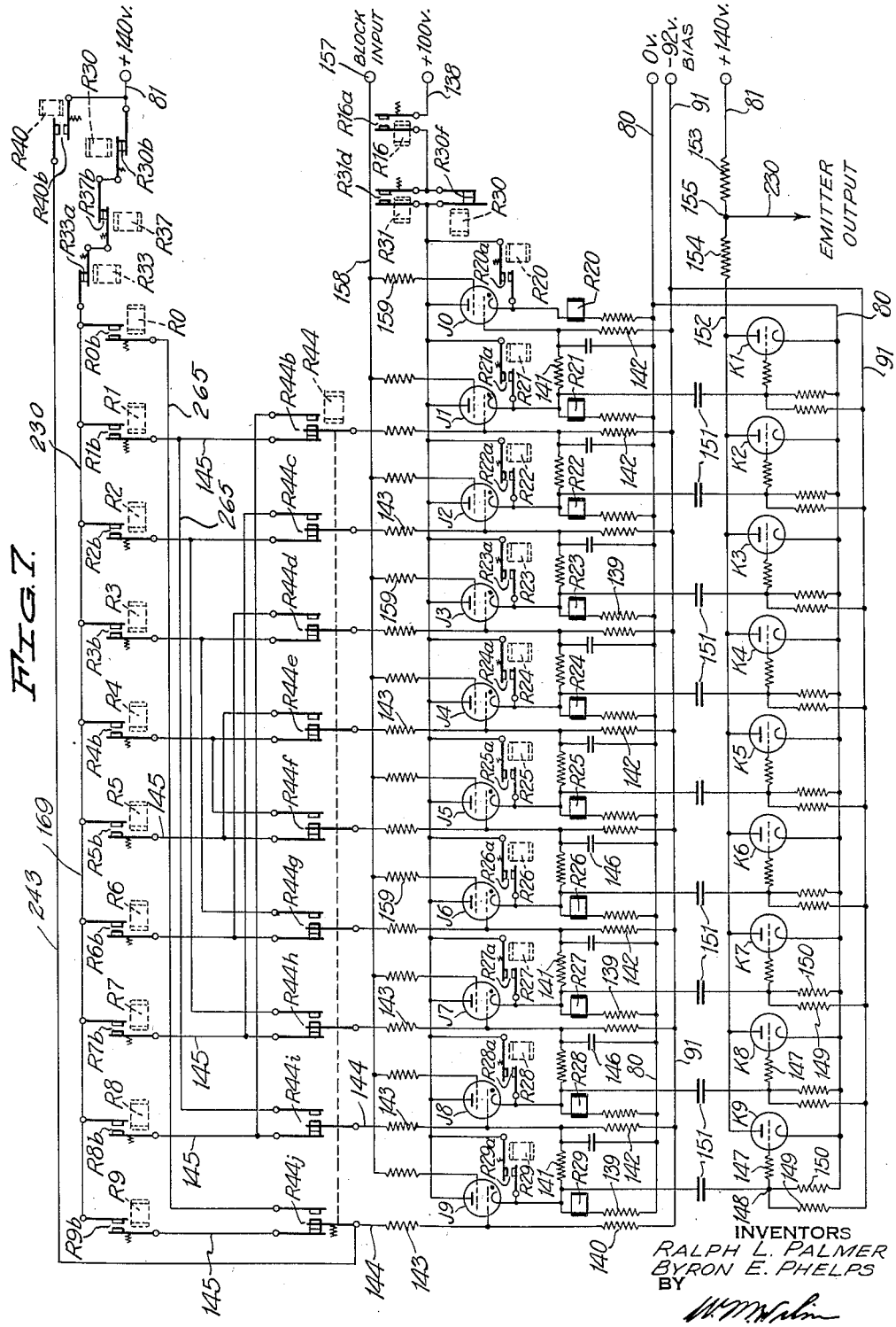

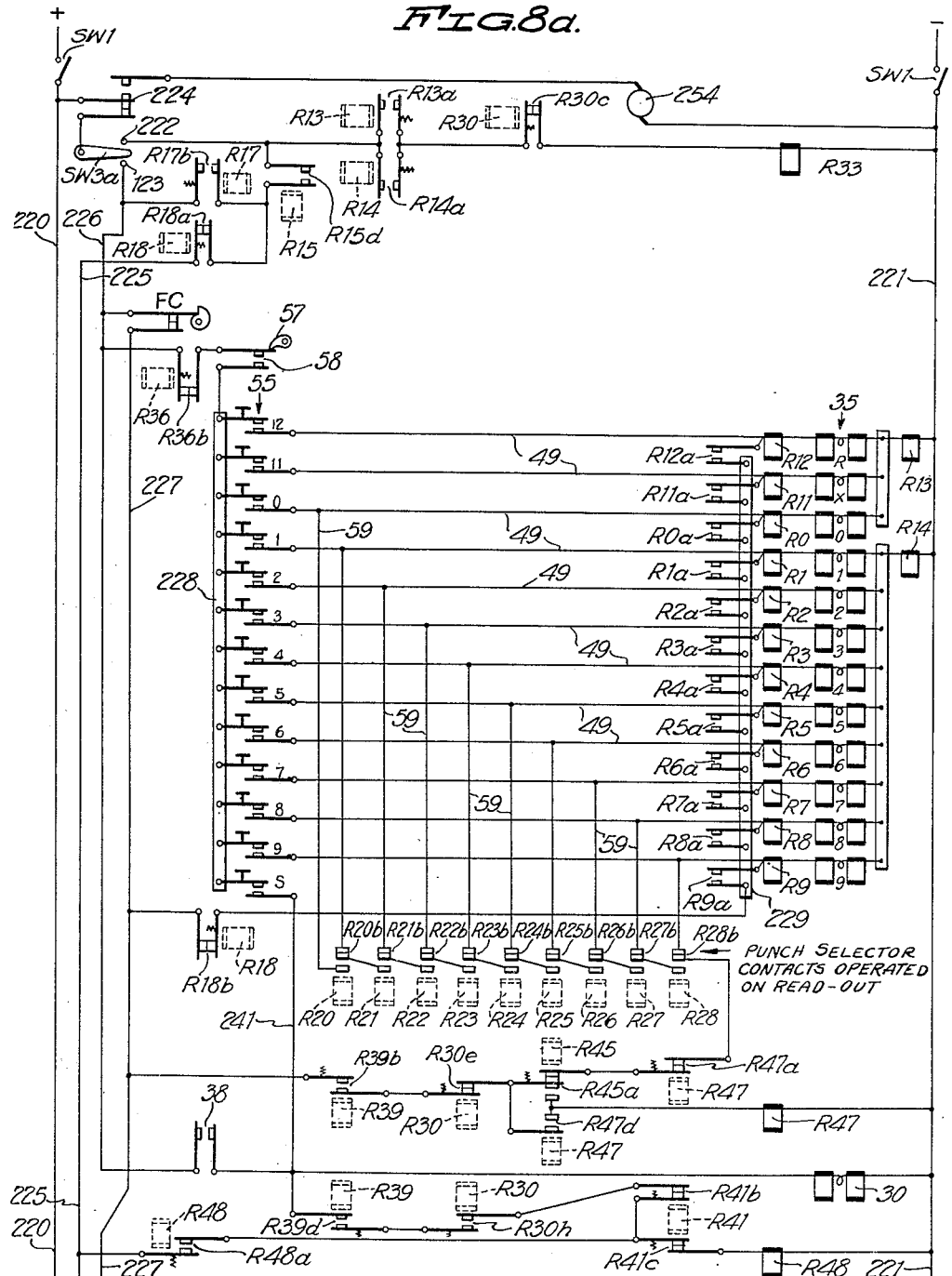

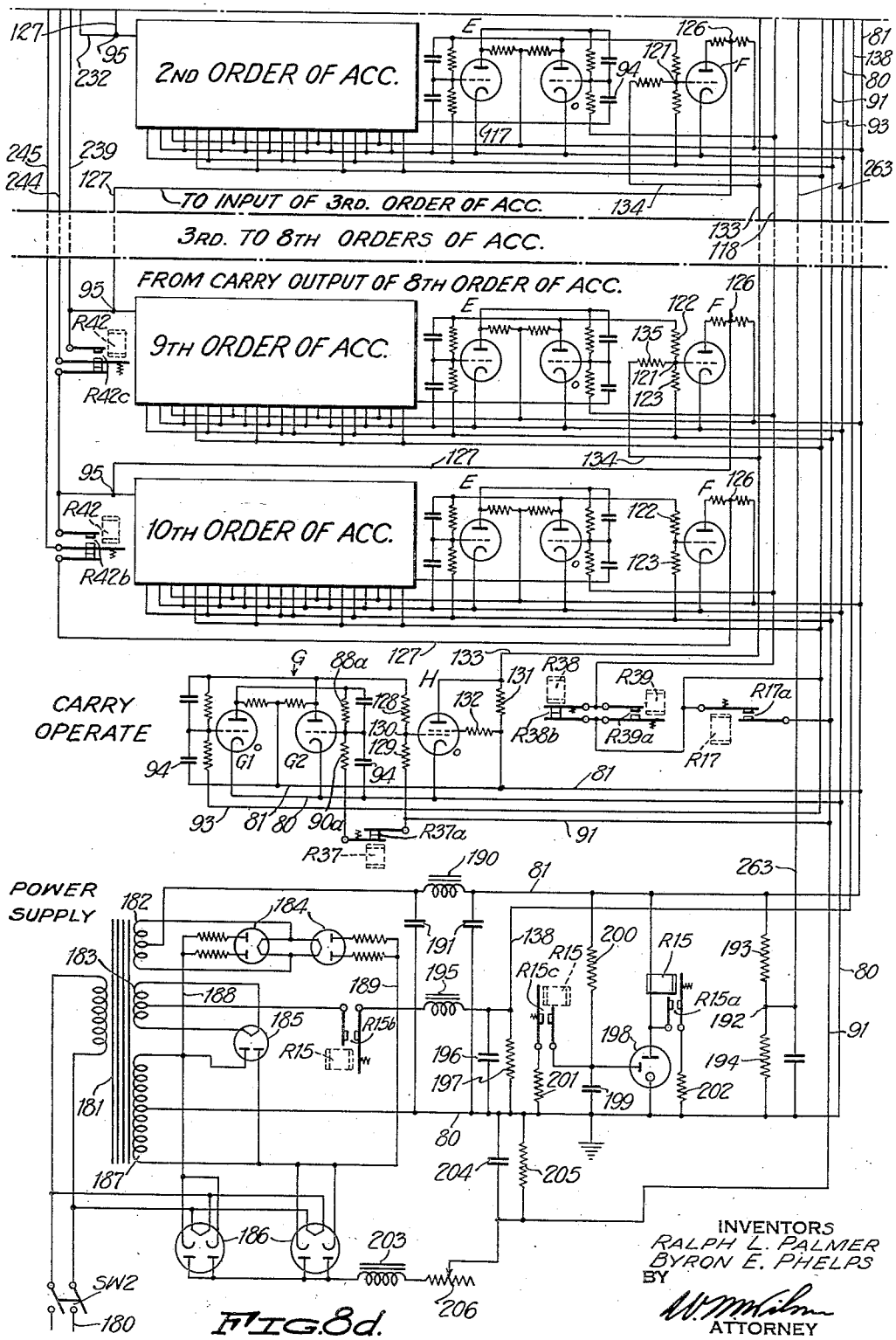

Patented Jan. 2, 1951

2,536,955

UNITED STATES PATENT OFFICE 2,536,955

ELECTRONIC ACCOUNTING MACHINE

Ralph L. Palmer, Binghamton, and Byron E. Phelps, Endicott, N. Y., assignors to International Business Machines Corporation, New York, N. Y., a corporation of New York Application December 27, 1944, Serial No. 569,992

12 Claims. (Cl. 235—61)

This invention relates to accounting or computing machines of the type employing electronic counters, that is, counters which comprise electrical networks including electronic tubes, the networks being so constituted as to undergo various predetermined changes in state, in response to the entry of values, the different states of the network representing different values. Such counters are customarily composed of chains of trigger circuits, each trigger circuit having two stable conditions which it assumes alternately on receiving a voltage impulse of the right characteristics. Such a counter is inherently binary in character.

Accordingly, one of the objects of the invention is to adapt this type of counter to the decimal system and to employ such counters in an electronic computing device.

Another object is to provide a novel combination of a counter embodying such electronic trigger circuits for selectively registering entered values and electronic readout means for electronically beating said trigger circuits to read out the value entered therein.

Another object is to provide an impulse emitter of such high speed as to utilize the rate-of-counting possibilities of the counter.

Another object is to combine the emitter with the counter so as to function both for readin and readout.

Another object is to combine an electronic accumulator with a recording mechanism so that amounts recorded are read into the accumulator, which then controls the recording mechanism to record a result of computation.

A specific object of the invention is to provide a machine which will record a plurality of numbers in succession, digit by digit, algebraically totalizing the numbers in an electronic accumulator and thereupon recording the total, digit by digit, under control of the accumulator.

Another specific object of the invention is to provide a cross-footing punch having an electronic accumulator which accumulates the values punched and finally automatically controls the punch to perforate the result of the computation.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a simplified vertical sectional view of the punch.

Fig. 2 is a face view of a portion of a perforated card.

Fig. 3 is a diagrammatic perspective view of the punch.

Fig. 4 is a vertical section of the punch keyboard.

Fig. 5 is a voltage diagram relating to the trigger circuit.

Fig. 6 is a circuit diagram of an electronic counter forming one order of the accumulator.

Fig. 6a is a block diagram of a modified electronic counter.

Fig. 7 is a circuit diagram of the emitter.

Figs. 8a to 8d are four parts of the complete circuit diagram of the apparatus and should be arranged in vertical sequence.

Figs. 9 and 10 are curves showing the voltage on the control grids of the emitter sequence tubes, and on the emitter output terminal respectively, in relation to time.

Figure 8B:
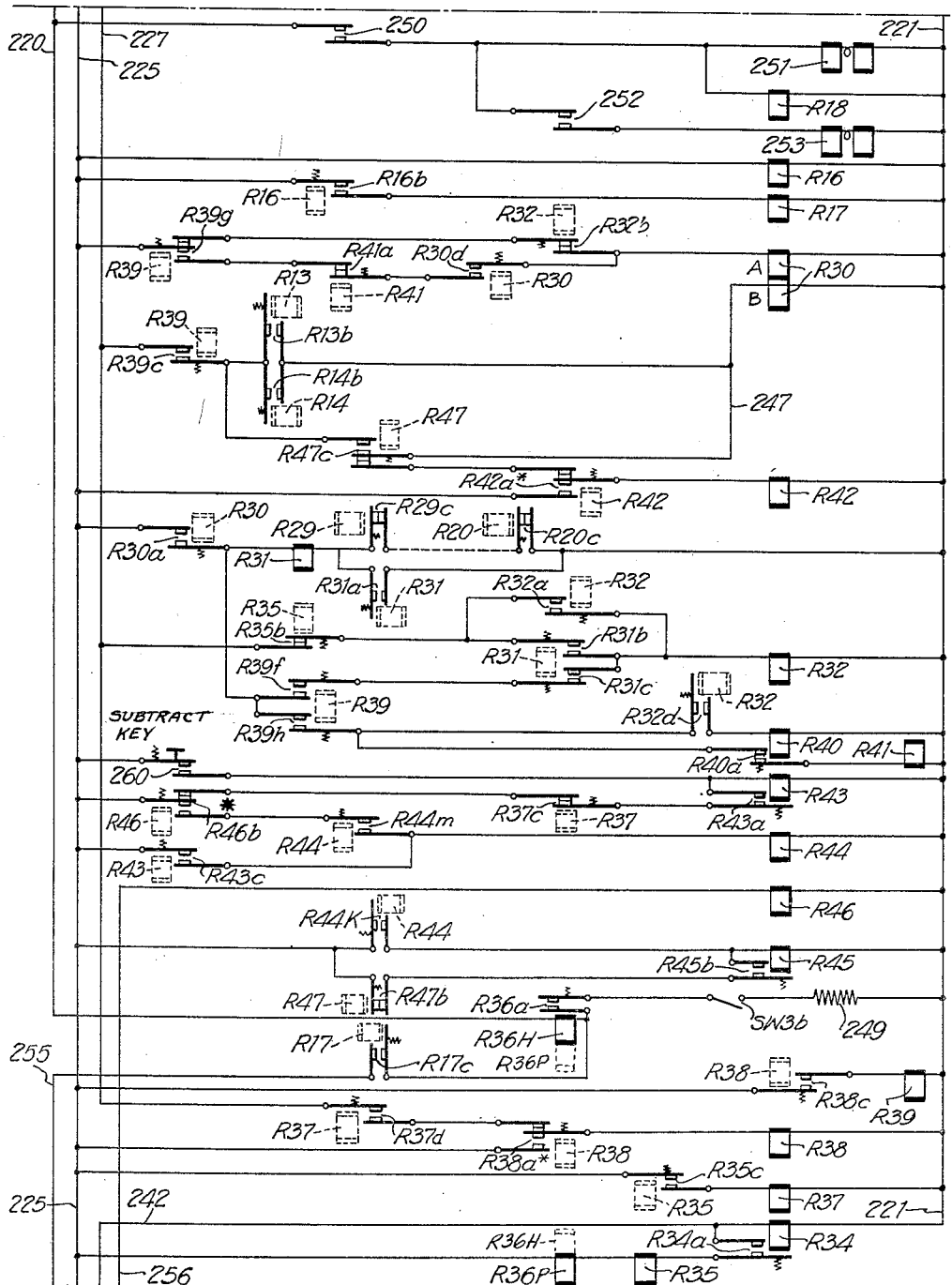

Some of the more specific features of the invention relate to a cross-footing punch, which has therefore been chosen to illustrate the principle of the invention, but other features have a wider application. The punch shown in the drawing is of a well known type, commonly referred to as the "International" duplicating punch. Its construction is shown in a number of patents, including Lee et al. Patent 1,976,618 and Knutsen 2,016,686. A separate keyboard is provided, like the one shown in Shafer Patent 2,315,741, in Fig. 8, and the lower right hand corner of Fig. 1.

A portion of one of the cards which can be perforated on this type of machine is shown in Fig. 2. The area of the card is sub-divided into vertical columns of index point positions. There are eighty columns in a full card and twelve index point positions in each column, one column being used for each digit of a number to be recorded. The index point positions pertaining, respectively, to the ten digits 0, 1 . . . 9 are indicated at the right side of the card in Fig. 2. The two upper index point positions are used for purposes which need not be referred to here. The portion of the card shown is divided by vertical lines 29 into three different fields. In the left hand or field A comprising columns 52 to 60, the number 401,250,549 is recorded by perforations and printed characters. The middle field, or field B comprising columns 61 to 69, contains the number 425,354. The right hand field, or field C comprising columns 70 to 89, contains the sum of the first two numbers, namely, 0401675903. With the machine now to be described, the left hand and middle fields are punched in succession, column by column, beginning with column 52, by manual operation of the keyboard. The numbers are added in the accumulator, order by order, as the keys are operated. When the card enters column 70 position, automatic perforation of the total, column by column, takes place under control of the accumulator, which is read out order by order and reset to zero condition. The numbers are not printed at the top of the card by this machine but are shown in the figure to interpret the perforations.

THE PUNCH CONSTRUCTION

In the drawing of the present application, only the parts of the punch which will be required to explain the invention are shown. There are twelve punches 10 (Figs. 1 and 3) arranged in a line and spaced apart in accordance with the vertical index point spacing of the record card. The punches are guided by a block 11 and coact with a die block 12 to perforate the record card Cd, which is fed between the blocks 11 and 12 by a pusher 13 mounted on a ratchet bar 14. The pusher and ratchet bar will be referred to herein as a card carriage. The punches are held in retracted position by individual springs 15 interposed between seats in the guide block 11 and the heads 16 of their respective punches. Each punch has a related interposer 17 resting upon the top of it. Above the interposers is a depressing bar 18 mounted on a plate 19 pivoted at 20 upon a stationary part, which is not shown in the drawings.

A link 21 articulated at 22 to a flange of the plate 19 extends downward and is pivotally connected by a bell crank lever 23 and a link 24 to an armature 25 pivoted on a stationary pin 26. The armature is operated by a punch magnet 30. Each interposer is connected by a related bell crank lever 31 to a stem 32, which can be depressed by an individual lever 33 having secured thereto an armature 34 operated by a related punch selector magnet 35. When any magnet 35 is energized, the interposer 17 pertaining thereto executes a movement to the left, so that its top edge 17a is positioned under the depressing bar 18. In moving to the left the interposer rocks a bail 36 to which is pivotally connected a hooked arm 37, the hook of which engages under the lower spring of a pair of contacts 38. As will be described later in connection with the wiring diagram, closure of contacts 38 completes a circuit to energize the punch magnet 30.

Consequently, the energization of any selector magnet 35 is followed by the energization of the punch magnet 30, which rocks the plate 19 downward, so that the depressing bar 18, acting through the end of the operated interposer, pushes the related punch through the card. The link 24 has fixed to it a lug 39 which knocks off the hook 37 from the lower contact 38 when the armature 25 swings to the right, allowing the contacts 38 to open and break the circuit of the punch magnet 30.

*Escapement.*—After each column of the record card is punched, the ratchet bar 14 is allowed to move a distance of one column width to the left, to position the next column of the record card under the punches. It is urged in this direction by a spring drum 27 (Fig. 3) acting through a gear 28 meshing with the teeth on the bottom of the ratchet bar. The movement of the ratchet bar is controlled by a well known form of escapement mechanism fully disclosed in the above mentioned patents. It includes a stepping dog 40 and a locking dog 48, which can be alternately brought into engagement with the ratchet bar 14 by an escapement operating mechanism. The latter includes a rock shaft 41 having fixed to it a cross arm 43 bearing at its two ends pins 44 and 45 providing connection with the stepping and locking dogs, respectively. The stepping dog is pivoted on the shaft 41 by a loose connection which permits it to move to the right, under the influence of a spring 46, when released from the ratchet bar.

The shaft 41 also has fixed to it a bail 50 (Fig. 1), from the cross bar 50a of which extends upwardly a finger 50b bearing against the bottom of the plate 19. Each time the plate 19 is depressed to perforate a column of the card and then raised when the punch magnet 30 is deenergized, the cross arm 43 is rocked counterclockwise, then clockwise, and the dogs are alternately engaged with the ratchet bar 14. When the locking dog engages it holds the ratchet bar substantially without movement, as the stepping dog is disengaged and escapes to a position above, and in front of, the next tooth. When the stepping dog is engaged and the locking dog is released, which occurs just before the punch reaches its normal position clear of the card, the ratchet bar escapes to the left for one tooth space, which causes a movement of the card for one column width.

A pair of contacts 47, referred to herein as the floating cam contacts, is opened by an arm 42 pivoted on the shaft 41 and raised by the stepping dog 40 as soon as the latter begins to be disengaged from the ratchet bar 14 and is held open until the stepping dog returns to full engagement with the ratchet bar. The closure of the contacts 47 is timed to occur after the hook 37 has become reengaged with the lower spring of contacts 38 (see Patent 1,976,618, page 4, lines 78–118). The function of the floating cam contacts in relation to this invention will become apparent later on.

*Keyboard.* — The keyboard controlling the punch selector magnets 35 is shown in Fig. 4. There are thirteen keys 51 (only three appearing in Fig. 4), one for each index point position and a space key. Each key operates an individual linkage comprising a bell crank 52, a slider 53, and a bell crank 54, to close a related pair of key contacts 55. A bail 56 operated by any slider 53 rocks a bell crank 57 to close a pair of bail contacts 58. In the wiring diagram (Fig. 8a) the twelve index point contacts 55 are individually identified by the numbers 0 to 12 and the spacing contacts by the letter S.

A stationary panel 61 extends upward behind the bed over which the cards are fed and is provided with two sets of column contacts 62 and 63 over which travel upper brushes 64 and lower brushes 65 mounted on a holder secured to a supporting arm 66 attached to the ratchet bar 14. Each column contact is connected to an individual plug hub 67. The upper brushes 64 are secured in a metal block 68 in which is also mounted a brush 69 which travels on a continuous strip 70. The lower brushes 65 are similarly mounted in a metal block 71 having a brush 72 bearing on a second continuous strip 73. The metal blocks 68 and 71 are secured to a bar of insulating material 74 attached to the arm 66.

The column readout mechanism just described serves to couple an impulse emitter to the particular order of the accumulator corresponding to the column being punched (and also to close various control circuits, as will appear more fully hereinafter). The emitter is controlled by the keys 51 so that each time a key is operated a number of impulses is emitted equal to the value of the key operated. The order of the accumulator connected to the emitter at the time by the column readout mechanism counts the impulses and takes a new setting indicative of the number of impulses counted. The accumulator is composed of ten orders, each order being constituted by an impulse counter, which will be referred to herein as an electronic counter, because it is an electrical circuit in which electronic tubes are used as the impulse responsive instrumentalities.

ELECTRONIC COUNTER

The electronic counter constituting one order of the accumulator is of the type as described and claimed in the divisional application of Byron E. Phelps, Serial No. 654,175 filed March 13, 1946, is shown schematically in Fig. 6. This counter comprises a series of interconnected trigger circuits A, B, C and D separated by dot-and-dash lines in Fig. 6. The principle of operation of counter circuits of this class is well known (see, for instance, a paper by Lifschutz and Lawson in Review of Scientific Instruments, for March 1938, page 3). Input impulses to be counted are impressed upon the first stage of the counter. On each second impulse received, the first stage passes an impulse to the second stage. The latter passes an impulse to the third stage on each alternate impulse received from the first stage, and so on through the series. The frequency of the input impulses is thus divided according to the function $$\frac{1}{2n}$$

where $n$ equals the number of stages. The third stage will pass an impulse to the fourth stage when the eighth impulse is received by the first stage, then the fourth stage will pass an impulse at the sixteenth impulse to be counted.

This system, in its known forms, is not directly suited for the decimal system and has been modified, in accordance with the present invention to cause the counter to count eight impulses and two additional impulses before passing an output impulse. The two additional impulses may be counted before the eight impulses are counted, for example, or after the eight impulses are counted. Two means for accomplishing this result will be described presently, by way of illustration.

*Trigger circuit.*—The individual trigger circuits operate according to a novel principle, which will be explained by reference to stage A in Fig. 6. Values of applied voltages, resistances, and capacitances are stated in the specification, in order to clarify the illustration, but they may be varied considerably without departing from the principles to be explained. The values given limit the speed of operation of the counter to 16,000–20,000 impulses per second, but the speed can be increased by suitable alteration of the circuit components.

The trigger circuit comprises two electronic tube elements, which may conveniently be the two halves of a twin tube, such as a 12SN7, or they may be two 6J5's. Some features of the invention are particularly concerned with triodes, which have for this reason been shown in the drawing, but other features of the invention are not limited to triodes. In this specification each element comprising a plate, cathode, and one or more grids is called a tube. The cathodes 79 are connected to a zero potential line 80, while the plates are connected to a +140 volt line 81, through equal resistances 82 and 83+84. The resistance 82 is shown as a single resistance of .02 megohm while the resistances 83 and 84 are of .005 and 0.15 megohm, respectively, an output lead 85 being connected to an output terminal 85a between the latter two resistances. The plate 86 of tube A2 is connected by a lead 87 to one end of a voltage divider composed of two resistances 88 and 90, each of .2 megohm, the other end of the voltage divider being connected to a −92 volt bias line 91. The grid 89 of tube A1 is connected to the mid-point of the voltage divider 88, 90. A condenser 92 of .001 microfarad is connected in parallel to the resistance 88. The plate 86 of the tube A1 is connected in the same way by a lead 87 to one end of a voltage divider 88a, 90a, the other end of which is connected to another −92 volt bias line 93, to be referred to as the "cancel" bias line. The grid 89 of tube A2 is connected to the mid-point of the voltage divider 88a, 90a. A condenser 92a of .001 microfarad is connected in parallel to resistance 88a. The grids of both tubes are further coupled by individual condensers 94 of .0005 microfarad, and a wire 96, to an input terminal 95; that is, the input terminal is connected to the front plates of the condensers 94 and the grids 89 are connected to the rear plates. The +140 volt line 81 is connected through a resistance 97 of .005 megohm to the input terminal 95. A resistance 98 of .027 megohm and a switch 99 are shown for connecting the input terminal 95 to the 0 volt line 80, but these are merely representative of certain impulsing instrumentalities to be described later on.

The trigger circuit has two stable conditions, in one of which the tube A1 is conductive, while in the other the tube A2 is conductive. When either tube is conductive, the other is biased below cutoff. An impulse having the right characteristics applied to the input terminal 95 will cause the circuit to reverse from either stable condition to the other. The small circle near the tube A2 indicates that this tube is conductive in the normal or 0 state of the counter. When the trigger circuit so reverses to the right, that is, the right hand tube A2 becomes conductive, an effective impulse is transmitted to the next stage, as will be explained presently. For this reason the right hand tube of each stage is called the transmitting tube while the left hand one is called the counting tube. A single stage of the counter is said to be "off" when it is in normal condition, with the transmitting tube conducting, and "on" when reversed.

The voltage drop from plate to cathode of one of these tubes when it is conducting current in the circuit is about 40 volts, hence the potential at the plate of tube A2, in the normal condition of the trigger circuit, is +40 volts. The mid-point 89a of the voltage divider 88, 90 is therefore at −26 volts potential. Since the tube cuts off at a grid potential of −8 volts, this tube is non-conductive.

If the potential of the plate of the tube A1 and of the grid 89 of tube A2 were determined only by the voltage drops across the voltage divider 82, 88a, 90a, by Ohm's law, the potential of this plate would be +129 volts, and the potential of the grid 89 of tube A2 would be +19 volts. However, when the tube A2 is conducting, due to a positive grid potential, grid current flows and reduces the potential of the grid of A2 to approximately zero volts, and this draws the potential of the plate of A1 down to about +127 volts. In this state the potential drop across the condenser 92 is 66 volts, while the condenser 92a is charged by a potential of 127 volts. The input terminal 95, with the switch 99 open, has a potential of +140 volts. If the switch is now closed, current will flow through the resistances 97 and 98 and the potential of the input terminal will drop by about 22 volts. This negative impulse applied through the condensers 94 to the grids of the tubes A1 and A2 will reduce the potential of the former to −48 volts and the potential of the latter to −22 volts.

Since both halves of the trigger circuit have the same time constant their condensers will reach 90% discharge at the same time, but because the tube A2 has been cut off by this negative impulse its plate potential jumps to a high value and causes the potential of the grid of tube A1 to rise much more rapidly than that of the grid of the tube A2. Thus, although the former starts from a lower potential, it rises above the cut-off potential ahead of the latter and the tube A1 becomes conductive. The potential of the plate of this tube drops sharply, driving down the potential of the grid of the tube A2, so that it cannot rise to the cut-off potential.

Fig. 5 is a diagram sketched from curves of grid voltage indicated by an oscilloscope. The curve 101 represents the potential of the grid of the tube which is non-conductive when the negative impulse arrives; the curve 102 represents the potential of the grid of the other tube. The negative impulse at time To depresses both potentials equally (to about half the theoretical negative peak if the wave front were vertical), then the curve 101 rises sharply, reaching the cut off potential, −8 volts, ahead of the curve 102. When this occurs the curve 102 turns down, away from the line 102a along which it would otherwise have moved. Atfer reaching a negative peak of about −80 volts the curve 102 rises toward its stable value of −26 volts. The curve 101 reaches a positive peak of about +7 volts, where it leaves the curve 101a, along which it would have traveled if its rise were not checked by grid current and subsides to about +.4 volts. The trigger circuit has reversed.

When the switch 99 is opened, the potential at terminal 95 will rise and a positive voltage impulse of about 22 volts will be transmitted through the condensers 94 of stage A to the grids of tubes A1 and A2. This tends to bring the potential on the grid of tube A2 from −26 to −4, but at the same time the potential on the plate of tube A1 drops, due to the rise in the grid potential of tube A1 and this drop of the plate potential of tube A1 holds the potential on the grid of tube A2 below the conducting point, −8 volts; in fact, actually drives said potential more negative. Therefore, only the negative impulse will reverse the trigger, and the auxiliary means, such as a coupling tube, usually required to enable a triode trigger circuit to discriminate between positive and negative impulses, is dispensed with.

Each of the stags B, C and D contains all of the basic features of the trigger circuit A described above. The output terminal 85a of trigger A is coupled by the lead 85 and condensers 94 to the grids 89 of tubes B1 and B2 and also by an extension of said lead and a condenser 94 to the grid 89 of tube D2. An output terminal 105 in the voltage divider 83, 84 of stage B is coupled by a lead 106 and condensers 94 to the grids 89 of tubes C1 and C2. An output terminal 107 in the voltage divider 83, 84 of stage C is coupled by a lead 108 and condenser 94 to the grid 89 of tube D1.

Stage B has, in addition to the basic trigger circuit, a locking tube B3, the plate of which is connected directly to the plate of the tube B2. The grid of the tube B3 is connected through a resistor 109, of .5 megohm, to the mid-point of a voltage divider comprising resistances 110 and 111, each of .5 megohm. One terminal of this voltage divider is connected by a wire 112 to the plate of tube D1, while the other terminal is connected to the −92 volt lead 91. The mid-point of the voltage divider 110, 111 is also coupled through a small condenser 113 of .00015 microfarad, and a wire 114, to the plate of tube D2. The small circles at the right of the tubes A2, B2, B3, C2, and D2 indicate that these tubes are conductive in the normal, or zero, condition of the counter. The counter can be restored to this condition by disconnecting the cancel bias wire 93 from the −92 volt supply, by means to be described presently.

When, in the course of entering a number in the counter, the second impulse is applied to the input terminal 95 and transfers trigger A back to the right, the point 85a drops from a potential of +137 volts to a potential of +115 volts. The drop in potential thus applied to the lead 85 is transmitted through the condenser 94 of the tube B2 and depresses the potential of the grid of that tube below cut-off, but since the tube B3 is conducting, its plate is maintained at a potential of +40 volts and the grid of tube B1 is thereby prevented from rising above the cut-off potential, in accordance with curve 101 of Fig. 5. The same negative impulse imparted to the lead 85 is transmitted to the grid of tube D2 and transfers the trigger D to the left. The potential of the plate of tube D1 and at the top of the voltage divider 110, 111 falls, but at the same time the potential on the plate of the tube D2 rises and this rise is transmitted through the wire 114 and condenser 113 to the mid-point 115 of the voltage divider 110, 111 and holds the grid of tube B3 above cut-off potential, until the second input impulse applied to the terminal 95 has ended.

The tube B3 is thereby maintained in a conductive state during this time and locks the trigger B against transferring, but as soon as the charge leaks off the condenser 113 the point 115 assumes a potential determined by the voltage divider 110, 111 and the tube B3 is cut off. The resistance 109 opposes grid current in the tube B3 and allows the point 115 to swing sufficiently positive to provide the necessary time delay to prevent the tube B3 from being cut off until the end of the second input impulse. The time delay terminates early enough to allow the tube B3 to become non-conductive before the fourth input impulse arrives. The fourth input impulse finds the tube B2 free of the influence of the tube B3, so that the potential on its plate rises toward its maximum value as the negative impulse applied to its grid renders the tube non-conductive. Therefore, the fourth input impulse transfers stage B to the left. The sixth impulse transfers stage B back to the right and causes an impulse to be transmitted from terminal 105 to stage C, turning the latter to the left. The tenth input impulse transfers stage C back to the right and causes an impulse to be transmitted from terminal 107 through the lead 108 to the tube D1, which transfers stage D back to the right. This causes a carry impulse to be transmitted from an output terminal 116, through lead 117 to a carry circuit soon to be described. The counter circuit itself is restored to zero condition by the tenth impulse and is ready to count further impulses. The complete sequence of conditions of the counter circuit is shown in the following table, in which "X" indicates the conductive state:

|   | A1 | B1 | B3 | C1 | D1 |
|---|----|----|----|----|----|
| 0 |    |    | X  |    |    |
| 1 | X  |    | X  |    |    |
| 2 |    |    |    |    | X  |
| 3 | X  |    |    |    | X  |
| 4 |    | X  |    |    | X  |
| 5 | X  | X  |    |    | X  |
| 6 |    |    |    | X  | X  |
| 7 | X  |    |    | X  | X  |
| 8 |    | X  |    | X  | X  |
| 9 | X  | X  |    | X  | X  |

The counter circuit just described and shown in Fig. 6 counts two impulses and then eight impulses. Fig. 6a illustrates how, by a simple modification of the circuit, the counter can be made to count eight impulses and then two impulses, the second one of the two impulses causing an output impulse from the counter. Fig. 6a is a block diagram representing a series of trigger circuits, which is assumed to be composed of the same elements, connected in the same way, as in Fig. 6, except for certain alterations in the interstage connections, to be referred to. This counter circuit comprises four stages A, B, C and D. The two tubes of each stage and related wires within each stage are represented by rectangles, A1, A2, B1, B2, etc., the stage B having a third rectangle, B3, representing a locking tube. The small circles show the normal or zero state of the counter; that is, they indicate that the right hand tube of each stage is normally conducting. The locking tube of stage B is normally non-conducting, since the right hand tube of stage D is normally conducting and, in this modification of Fig. 6a through wire 112a, the potential of the plate of this tube, which is depressed by the conductive state of the tube, acts through the resistance 110 to hold the grid of the locking tube B3 below the cut-off potential.

The first eight impulses cause the counter circuit to pass through a normal series of changes, the eighth impulse causing a carry impulse to be transmitted from the output of the tube C2 to the grid of the tube D2, which reverses the trigger circuit D. The rise in potential of the plate of tube D2 is transmitted through wire 112a, tending to raise the potential of the grid of tube B3. A negative impulse transmitted from the plate of tube D1, which has now become conductive, through wire 114a, and condenser 113, temporarily holds down the potential of the grid of tube B3, until the condenser 113 is discharged. The tube B3 then becomes conductive and locks stage B in its right hand condition. The action is identical to that previously described in reference to Fig. 6.

When two more impulses follow, the second of such impulses is transmitted from tube A2 to both tubes of stage B and also to the tube D1 only of trigger D. At this time the locking tube B3 is conductive and stage B cannot respond to the impulse; it remains in its normal state shown in Fig. 6a. The impulse transmitted to tube D1, on the other hand, reverses stage D to its normal state and causes an output impulse to be sent through the output wire 117. The entire counter circuit is then in its normal state, with all the trigger circuits transferred to the right and the locking tube B3 non-conducting. The complete sequence of conditions of the counter in Fig. 6a is shown in the following table:

|   | A1 | B1 | B3 | C1 | D1 |
|---|----|----|----|----|----|
| 0 |    |    |    |    |    |
| 1 | X  |    |    |    |    |
| 2 |    | X  |    |    |    |
| 3 | X  | X  |    |    |    |
| 4 |    |    |    | X  |    |
| 5 | X  |    |    | X  |    |
| 6 |    | X  |    | X  |    |
| 7 | X  | X  |    | X  |    |
| 8 |    |    | X  |    | X  |
| 9 | X  |    | X  |    | X  |

The two circuits shown in Figs. 6 and 6a are illustrative of how a binary counter can be modified, in accordance with the invention, to count by the decimal system, which is the most useful modification. The principle can be applied, however, to counting in other systems. For example for duodecimal counting the locking tube can be annexed to stage C and the output impulses of stage B instead of stage A, sent to stage D, to reverse the latter in one direction. The principle of operation is characterized by the fact that a higher stage controls an intermediate stage to prevent response to certain impulses, thereby modifying the normal binary sequence. Also, the highest stage is made to execute its complete cycle in two steps, one of which is determined by the transmission of an operating impulse from the next lower stage, which turns the highest stage in one direction, while the other is determined by the transmission of an operating impulse from a stage further down in the series, which turns the highest stage in the other direction.

By assuming different permutations of "On" and "Off" conditions for the various stages, such permutations can selectively represent any chosen value entered into any particular group of stages.

THE CARRY CIRCUITS

The output terminal 116 is coupled through the lead 117 and a condenser 94 to the grid of tube E2 (see Fig. 8c, first order of accumulator) which constitutes the right half of a carry trigger circuit E, substantially like the counter trigger circuits. The grid of the tube E1 is coupled through a condenser 94 to the 0 volt line 89. The lower end of the grid voltage divider 88a, 90a of tube E2 is connected to another —92 volt cancel bus 119. The small circle next to the tube E2 indicates that this tube is normally conductive. When a carry impulse is impressed upon the grid of the tube E2, the carry trigger E transfers to the left. Associated with the carry trigger circuit is a triode F, the grid of which is connected to an intermediate point 121 of a voltage divider composed of two resistances 122 and 123 of .5 and .19 megohm, respectively, connected between plate of tube E2 and the —92 volt lead 91. The plate of the tube F is connected through a voltage divider 124, 125 to the +140 volt line 81. A carry transfer terminal 126 at the mid-point of the voltage divider is connected by a lead 127 to the input terminal 95 of the second order of the accumulator (Fig. 8d). The potential on the grid of tube F is considerably below cut-off when the tube E2 is conducting. When the trigger E transfers to the left, the plate potential of the tube E2 rises and lifts the potential of the grid of tube F to just below the point at which the tube becomes conductive. The carry circuit remains in this condition, after receiving a carry impulse through its counter output lead 117, until the "carry operate" time to be described presently.

The counters and carry circuits of all ten orders are identical and the carry transfer terminal 126 of each of the first to ninth orders is connected by a lead 127 to the input terminal 95 of the next higher order. The tenth order also has a carry transfer terminal 126, the function of which will be described later.

*Carry operate.*—A carry operate trigger circuit G is shown in Fig. 8d. This trigger circuit is similar to those previously described and has associated with it a power tube H, such as a 25L6. The grid of tube G1 is coupled through a condenser 94 to the +140 volt line 81, while the grid of tube G2 is coupled through a condenser 94 to the zero volt line 80. The lower end of the grid voltage divider 88a, 90a of tube G2 is connected through normally closed contacts R37a to the −92 volt bias line 91. The plate of tube G2 is connected through a voltage divider 128, 129 to the −92 volt bias line 91 and the control grid of tube H is connected to an intermediate point 130 of this voltage divider. The plate and screen grid of tube H are connected to the +140 volt line 81, the former through a resistance 131 of .0025 megohm, the latter through a resistance 132 of .0004 megohm. A bus wire 133 connected to the plate of tube H has nine branches 134 connected, respectively, through resistances 135 of .5 megohm each to the points 121 to which are connected the grids of the F tubes of orders one to nine.

In contradistinction to the other triggers, the left hand tube G1 of the trigger G and the power tube H are normally conductive, as indicated by the adjacent small circles. When the relay R37 is energized at a certain time in the operation of the machine, as will be described later, its contacts R37a open and the potential of the grid of tube G2 rises and transfers the trigger G to the right. The plate potential of the tube G2 drops and depresses the potential on the grid of tube H sufficiently to cut off this tube. The plate potential of the tube H, which is held down to about +40 volts while the tube is conducting, rises to +140 volts, allowing the bus wire 133 to assume this voltage which renders conductive the tube F of any order in which its trigger E has been transferred to the left by a carry impulse. When any tube F becomes conductive, the potential of the related carry transfer terminal 126 drops and a negative voltage impulse is transmitted to the input terminal 95 of the next higher order, adding one in that order.

THE EMITTER

Figure 8C:
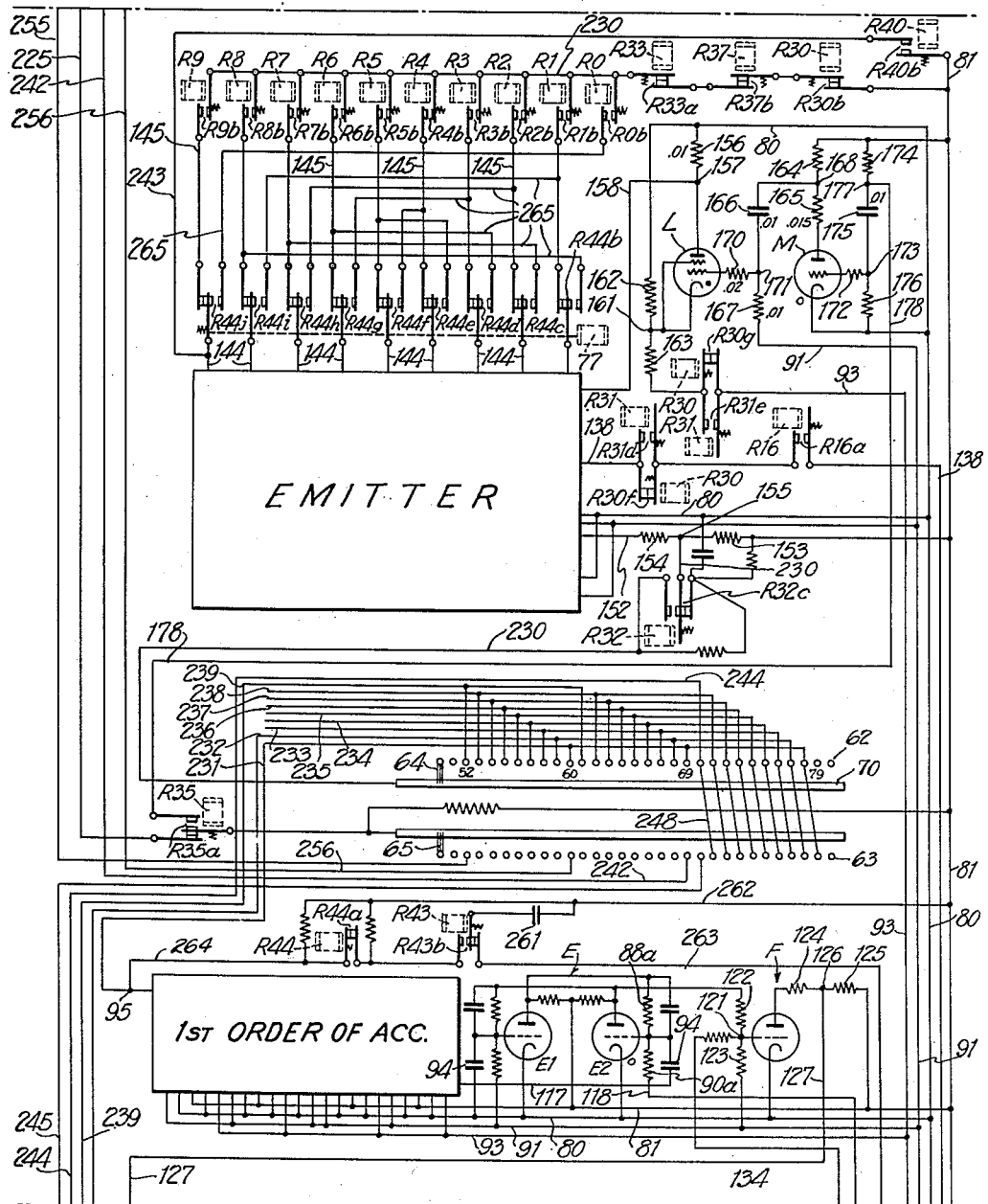

The operating impulses for the counters of the accumulator are generated by an emitter shown by itself in detail in Fig. 7, and, in relation to the other circuits, in Fig. 8c. In order to utilize the high speed counting potentialities of the electronic counter, the impulses are originated by an electronic emitter comprising a series of electronic tubes interconnected in such a way as to operate in a timed sequence. Fig. 7 shows ten such electronic tubes J9, J8 ... J1, J0. For reasons which will appear as the description proceeds, these tubes are preferably gaseous tetrodes such as RCA 2050's. The plates of these tubes are connected in multiple to a +100 volt line 138. These cathodes are connected through the coils of individual relays R29, R28 ... R21, R20 and resistances 139 of .001 megohm each, to the zero volt line 80. The control grid of the tube J9 is connected through a resistor 140 of .1 megohm to the −92 volt line 91, and thereby normally biased to −92 volts. The control grid of each of the other tubes is connected to the approximate mid-point of a voltage divider composed of two .1 megohm resistors, 141, 142, connected between the cathode of the next tube to the left and the −92 volt line 91, being thereby biased to approximately −45 volts. Each control grid of the tube J9—J1 is also connected through a resistor 143 of .05 megohm, wire 144, relay contacts R44j—R44b in normal position, and a wire 145 to one spring of respective relay contacts R9b, R8b ... R1b. The other springs of the latter contacts are connected by a common wire 199 and normally closed relay contacts R33a, R37b, and R39b to the +140 volt line 81. The potential of the shield grids of the J tubes is controlled by means to be described presently so as to be normally the same as the cathode potential. The relays R29—R20 have contacts R29a—R20a adapted to shunt their related tubes J9—J0, when the relays are energized.

When any tube of the J series is fired by closure of the related relay contacts R9b, etc., upon energization of the corresponding relays R9, etc. (Fig. 8a), upon operation of a key contact 55, which brings the potential of its control grid above the critical point, the cathode potential of that tube rises to about +92 volts, since the voltage drop from plate to cathode of one of these tubes is about 8 volts. This raises the potential of the control grid of the next J tube to the right to zero, causing the latter tube to fire. A condenser 146 of .005 mfd., connected between the said control grid and the zero volt line 80, delays the rise of potential of the control grid to the critical point for a predetermined time interval, approximately, .15 millisecond, in this case. Accordingly, when a certain J tube is fired, all of the J tubes to the right of it will be fired in a uniformly timed sequence.

In order to cause a succession of distinct, square wave, negative voltage impulses to be impressed upon one of the input terminals 95 of the accumulator counters, when a sequence of the J tubes is fired, a series of coupling tubes K9, K8...K1 is used. These may be twin triodes such as 12SN7's, one-half of each twin triode being coupled to a related tube of the J series. The cathodes of the K tubes are connected in multiple to the 0 volt line 80. Their grids are connected through grid resistors 147 of .5 megohm to intermediate points 148 on voltage dividers 149, 150 extending between the 0 volt line 80 and the −92 volt line 91. The resistances 149 and 150 are .1 and .025 megohm, respectively. The K tubes are thereby normally biased well below the cut-off. The grids of these tubes are coupled by condensers 151 of .002 mfd. to the cathodes of their respective tubes of the J series. The plates of the K tubes are connected in multiple by a lead 152 through an output voltage divider 153, 154 to the +140 volt line 81. The resistances 153 and 154 are .005 and .015 megohm respectively. The impulses for operating the counter are tapped off the output terminal 155 of this voltage divider. When a K tube becomes conductive, its plate voltage drops to about +40 and the potential of the output terminal 155 drops about 25 volts, applying a negative impulse to the input terminal of one of the counters, through a circuit which will be traced presently. The time duration of the individual negative impulses is determined by the time constant of the coupling circuits between the J tubes and the K tubes. This time constant is shorter than that of the circuits coupling adjacent J tubes, consequently the negative impulses applied to the input terminal 95 of a counter are separated by intervals during which the circuit conditions return to normal. Fig. 9 shows a sequence of potential curves for the control grids of the J tubes. At T9, the tube J9 is fired as described above. Thereupon, the other tubes fire at T8, T7...T1, T0. Fig. 10 shows the resulting curve of potential of the emitter output terminal 155.

*Block circuit.*—During reading of numbers into the accumulator, the shield grids of the J tubes are maintained constantly at cathode potential. However, the emitter is also used in a novel combination with the accumulator counters for reading out the accumulator, and in this operation the shield grids have a control function. In the novel readout, a sequence of impulses is initiated by firing the J9 tube, which starts a series of impulses which are employed to electronically "beat" the triggers of a counter to advance a particular counter of the accumulator from its definitive condition to 0. When the counter goes to 0, a carry impulse is transmitted to a blocking circuit, which causes a negative bias to be impressed upon the shield grids of the J tubes, to prevent all those which have not yet been fired from firing. The last tube of the emitter to be fired before the blocking bias is imposed represents extraneously of the counter the number which stood within the counter upon initiation of read out.

Voltage is supplied to the shield grids of the J tubes as follows: From the zero volt line 80 (Fig. 8c), through a resistor 156 (upper right) of .01 megohm to a terminal 157 (see also Fig. 7), thence through a bus wire 158 and individual grid resistors 159 of .1 megohm each, to the shield grids. The terminal 157 (Fig. 8c) is connected to the plate of a tube L, which may be a 2050 gaseous tube having its shield grid and cathode connected to an intermediate point 161 of a voltage divider comprising resistances 162 and 163 of .007 and .001 megohm, respectively, connected between the 0 volt line 80 and (through normally closed contacts R30g) the —92 volt cancel bias line 93. An impulse inverter tube M, which may be a 6J5, has its plate connected through a voltage divider, composed of resistances 164 and 165 of .005 and .015 megohm, respectively, to the +140 volt line 81. A coupling circuit comprising a condenser 166 of .01 mfd. and a resistance 167 of .1 megohm extends from a point 168 of the voltage divider 164, 165 to the —92 volt bias line 91. The control grid of the tube L is connected through a grid resistor 170 to a point 171 of said coupling circuit. The cathode of the tube M is connected to the zero volt line 80 while the grid is connected through a grid resistor 172 of .1 megohm to a point 173 of a coupling circuit extending between the +140 volt line 81 and the 0 volt line 80 and consisting of a resistor 174 of .05 megohm, a condenser 175 of .01 mfd., and a resistor 176 of .1 megohm. A point 177 on this coupling circuit is connected by a wire 178 to the upper spring of transfer contacts R35a controlled by a relay R35 to be referred to later. The tube L is normally non-conducting, while the tube M is normally conducting. When a negative voltage impulse is transmitted over the wire 178 to the grid of tube M, this tube is cut off and the voltage on its plate rises. The control grid of tube L is thereby drawn up to a voltage which will cause the tube L to fire, dropping its plate voltage to minus 80 volts. Through the wire 158 this voltage is impressed upon the shield grids of the J tubes, blocking the firing of any unfired tubes of this series and thereby indicating the value of the number standing in the particular counter before read-out was initiated. The read-out operation will be further explained in connection with an illustrative example presently.

POWER SUPPLY

The power supply for the electronic circuits is derived from a conventional source shown in Fig. 8d. Since a number of different voltages have to be supplied, there are several more or less independent sources in the power supply circuit. An alternating current line 180 supplies alternating current through a switch SW2 to the primary winding of a transformer 181. Cathode heater current is supplied from two secondary windings 182 and 183 to a pair of full wave rectifier tubes 184 and a single full wave rectifier tube 185. The tubes 184 may be 83's while the tube 185 may be an EL–1C. Two other rectifier tubes 186 are supplied with filament heater current directly from the alternating current source, these tubes being 117Z6's. The 140 volt line 81 is tapped off the mid-point of secondary winding 182 while the 0 volt line 80 extends to the mid-point of a secondary winding 187 of the transformer 181, from the terminals of which the circuit is extended through wires 188, 189 to the plates of tubes 184, and from the filaments of these tubes to the terminals of the secondary winding 182.

A filter across the 140 volt supply is represented by an inductance 190 and two condensers 191. A 115 volt supply is tapped off an intermediate point 192 of a voltage divider composed of resistances 193, 194 of .0015 and .005 megohm respectively, extending between the 140 volt line 81 and the 0 volt line 80. The 100 volt line 139 extends to the mid-point of the secondary winding 183, thence through the tube 185 to the terminals of the secondary winding 187, from the mid-point of which the 0 volt line extends. The current in this circuit is smoothed by an inductance 195 and condenser 196 and regulated by a resistor 197. The circuit is normally open at relay contacts R15b, the coil of this relay R15 being in the plate circuit of a tube 198, for instance an OA4G, forming part of a time delay circuit. When voltage appears across the 140 volt supply, the starter anode of the tube 198 first takes an approximately 0 potential, due to its coupling through the condenser 199 to the 0 volt line 80, and through the 50 megohm resistor 200 to the 140 volt line 81. As the condenser charges, the potential of the starter anode of tube 198 rises at a certain time rate and fires the tube after a sufficient delay to protect the emitter supply rectifier tube 185 and to provide an interlock, to be referred to later, for disabling the punch circuits while the electronic units are warming up.

When the relay R15 is energized its contacts R15a complete a holding circuit for it through the resistance 202. The contacts R15b close the circuit to the 100 volt line, while the contacts R15c connect the starter anode of the tube through a small resistance 201 to the 0 volt line. The —92 volt line extends to the plates of the tubes 186 and from the cathodes of these tubes to the opposite ends of the secondary winding 187, to mid-point of which the 0 volt line is connected. A smoothing inductance 203, condenser 204 and resistance 205 are also provided for this line, as well as a rheostat 206 for exact regulation of the bias voltage.

OPERATION

The operation of the machine will now be explained by showing how a particular problem is carried out on it.

The main switches SW1 (Fig. 8a) and SW2 (Fig. 8d) are closed, the former extending direct current line potential to the bus wire 220 and return wire 221, while the latter starts the power supply. A potential of +140 volts builds up between the line wires 81 and 80. The condenser 199 (Fig. 8d) begins to charge and, when it reaches about 85 volts above 0 potential, the tube 198 fires, energizing relay R15. The R15a contacts close, holding the relay R15 across the 140 volt line. The R15c contact points close, discharging condenser 199. The R15b contacts close, applying 100 volts potential to the bus wire 138. Also, —92 volts potential is applied to bus wire 91.

Switch SW3a (Fig. 8a) is manually moved to the upper terminal 222 (the lower terminal 123 is for operating the punch in the normal manner without cross footing). Contacts R15d close, closing a circuit from the positive line, through latch contacts 224, switch SW3a, said contacts R15d, and normally closed contacts R18a to the control relay bus wire 225. Relay R16 (Fig. 8b) connected directly between the bus wire 225 and the negative line wire 221, is energized. The contacts R16a (Fig. 8c, middle right) close, extending potential from the +100 volt bus wire 138, through normally closed contacts R39f to the plates of the J tubes (Fig. 7). Contacts R16b (Fig. 8b) close, energizing the relay R17. Contacts R17a (Fig. 8d) close, extending —92 volts from the bias bus wire 91 to the counter cancel bus wire 93 and through normally closed contacts R38b to the carry cancel bus wire 118. Contacts R17b (Fig. 8a) close, extending positive line potential from contacts R15d (now closed) to the bus wire 226. Contacts R17c (Fig. 8b, lower middle) close, preparing a circuit to be referred to later.

In the counters (Figs. 6, 8c and 8d), negative bias potential is applied to the grids of the left hand tubes in each stage, from wire 91, before negative bias potential is applied to the grids of the right hand tubes of each stage through wire 93 energized by operation of relay R17, as described above. Consequently, the counters start with their right hand tubes conducting, which is the 0 condition. The same is true of the carry triggers E (Figs. 8c and 8d), since the grids of the left hand tubes receive their bias directly from wire 91, while the grids of the right hand tubes are biased through contacts R17a, R38b, and wire 118. In the carry operate trigger circuit G, however (Fig. 8d), first the grid of the right hand tube is biased through wire 91 and normally closed contacts R37a, while the grid of the left hand tube receives its bias later, through wire 93. Hence this particular trigger circuit starts, with the left hand tube G1 conducting. Hence, the right hand tube is not conducting and this causes the tube H to become conductive. The tube M (Fig. 8c) becomes conductive as soon as operative voltage appears across 80 and 81. On the other hand, the control grid of tube L is negatively biased from wire 91 before its cathode is supplied with voltage through wire 93. Therefore, this tube is initially non-conductive.

On closure of the contacts R15d supplying voltage to bus wire 225, as previously mentioned, potential is extended through the control relay bus wire 225 (Fig. 8b), normally closed contacts R39g and R32b and the A coil of relay R30, energizing said relay. Contacts R30a close, extending a circuit from bus wire 225 through said contacts, relay R31, the series of normally closed contacts R29c—R20c all closed, since no emitter tube (Fig. 7) is ignited, to the wire 221, energizing R31. Contacts R31a thereupon close, shunting the contacts R29c—R29c. The contacts R31b close, extending a circuit from the bus wire 226 (Fig. 8a), through normally closed contacts FC, bus wire 227 (Fig. 8b), normally closed contacts R35b, said contacts R31b and relay R32 to wire 221, energizing R32. Contacts R32a close, holding relay R32 through the FC contacts after R31 is deenergized.

The other contacts of relays R30 and R31 will be referred to later. Contacts R32b open, dropping out relay R30. The contacts R30a return to their normal open position deenergizing relay R31, so that contacts R31b open. A blank card is now fed from the stack at the right side of the punch to the card feeding mechanism (Figs. 1 and 3), in the well known manner described, for example, in the above mentioned Lee et al. Patent 1,976 618, page 2, line 15. By means of a high bar skip (see Read Patent 1,962,750, page 4, left line 7) the card is fed directly to that position in which column 52 (Fig. 2) stands under the row of punches 10. During this skipping operation the stepping dog 40 is lifted by the skip lifter described in the Read patent and holds open the contacts FC. The relay R32 is thereupon deenergized, the contacts R32b close, and the relays R30 and R31 pick up again on the control relay bus 225. The contacts R31b close again preparing a circuit for relay R32, which will be completed as soon as the contacts FC close. This occurs when the card arrives in column 52 position and the skip lifter rides off a high portion of the skip bar. Contacts R32a then close, completing a holding circuit for the relay R32 through the bus wire 227. Contacts R32b open, dropping out relays R30 and R31. Contacts R32c (Fig. 8c) transfer, connecting, via line 230 and said contacts, the emitter output terminal 155 to the upper brush 64 of the column readout mechanism. The machine is now ready to begin operation of the keyboard.

*Adding.*—According to the problem shown in Fig. 2, column 52, the first column of field A, is to be punched to represent the numeral 4. The number 4 key is operated, closing the number 4 contacts 55 (Fig. 8a) and completing a circuit from bus wire 226, through normally closed contacts R36b, bail contacts 58 (Fig. 4), bus bar 228, said number 4 key contacts, wire 49, relay R4, the number 4 punch selector magnet 35, and relay R14 to line wire 221, energizing said relays and said magnet. Contacts R4a close, completing a holding circuit from bus wire 226, through the floating cam contacts FC now closed, bus wire 227, normally closed contacts R18b, bus bar 229, said contacts R4a, relay R4, the #4 magnet 35 and relay R14 to wire 221. Contacts R4b (Fig. 7) close, completing a circuit from the +140 volt bus wire 81, through normally closed contacts R30b, R37b and R33a, bus wire 230, said contacts R4b, wire 145, contacts R44e in normal position, resistances 143 and 142, to the —92 volt bias wire 91. The potential of the control grid of the #4 J tube is raised above the critical point and this tube fires. The #3, #2, #1, and #0 J tubes then fire in timed sequence, in the manner previously described. Four negative voltage impulses are transmitted, as set out below, to the ninth order of the accumulator, as the #4, #3, #2, and #1 K tubes become conductive in succession and apply four negative voltage waves (see Fig. 10) to the emitter output terminal 155. These negative impulses are transmitted from this point through contacts R32c in transferred position (Fig. 8c), wire 230, bus bar 70, upper brush 64, that one of the column contacts 62 for column 52, wire 239 (see also Fig. 8d), to the input terminal 95 of the ninth order of the accumulator. The first negative impulse is applied through the coupling condensers 94 (Fig. 6) of stage A, depressing the potential of both grids 89 by about 22 volts, which brings the potential of the grid of tube A2 to —20 and renders the tube non-conductive. The trigger circuit constituting stage A reverses in the manner previously described, and leaves the tube A1 in a conductive condition and the tube A2 in a non-conductive condition. A positive impulse is applied to the lead 85 when the potential of the plate of the tube A2 rises to approximately 129 volts, but this has no effect because the trigger circuits do not respond to a positive voltage impulse of about 22 volts.

The second negative impulse transmitted from the emitter output point 155, over the circuit previously described, reverses the stage A trigger circuit back to normal condition and produces a negative impulse on the lead 85. This negative impulse is not effective to reverse the stage B trigger circuit because the latter is locked by the tube B3, which is conductive at this time. The negative impulse does transfer the stage D trigger circuit to the left, with the result that a transient high voltage is maintained on the grid of tube B3 as previously described, but on discharge of the condenser 113 the potential on the grid of tube B3 is depressed below cut-off, leaving stage B unlocked.

The third impulse transmitted to the input terminal 95 reverses the stage A trigger circuit to the left and the fourth impulse reverses it back to the right. This time the negative impulse transmitted through lead 85 and condensers 94 of stage B to the grids 89 of tubes B1 and B2 reverses the stage B trigger circuit to the left. This negative impulse impressed on lead 85 at this time has no effect upon stage D, since the lead 85 is only coupled to the grid of the right hand tube D2, which is now non-conducting. The condition of the ninth order counter (Figs. 6 and 8d) after the four impulses have been transmitted is as follows: A2 is conductive, B1 is conductive, B3 is non-conductive, C2 is conductive and D1 is conductive. Thus the counter indicates the number 4, which is the first digit of the first number to be entered.

The operation of the electronic circuits occurs very rapidly. Some time after each of the #4, 3, 2 and 1 J tubes fire, their related relays R24, R23, R22 and R21 become energized and close their a contacts completing holding circuits for those relays between the 100 volt line 138 and the 0 volt line 89 and shunting out the related J tubes. The b contacts of these relays (Fig. 8a) also transfer, but without effect at this time, while their c contacts (Fig. 8b) open.

When a key is depressed and relay R14 (Fig. 8a) is energized, as previously described, its contacts R14a (Fig. 8a) close, completing a circuit from switch SW3a, through said contacts, contacts R38c now closed, and relay R33 to line 221, energizing said relay. Contacts R33a (Fig. 7) open the circuit to the grids of the J tubes, preventing operation of these tubes by accidental or too rapid operation of a second key. Without the contacts R33a, if the second key were operated too soon and were a higher key than the one previously operated, its J tube and the untripped ones to the right of it would be fired and would transmit a corresponding number of additional impulses to the ninth order of the accumulator.

The punch magnet contacts 38 (Figs. 1 and 8a) are closed by the #4 interposer 17, completing a circuit from bus wire 226, through said contacts 38, and punch magnet 38, to wire 221, energizing said magnet and causing a hole to be punched in #4 index point of column 52 of the card. As the escapement mechanism begins to operate, the floating cam contacts FC open and the holding circuit of relay R32 is broken. This relay becomes deenergized and its R32c contacts (Fig. 8c) transfer, disconnecting the emitter output terminal from the counters to prevent transients occurring during emitter cancellation, which is to follow, from reaching the counters. The R32b contacts (Fig. 8b) close, picking up relay R30 through its A coils. The contacts R30b (Fig. 7) open to maintain the emitter control circuit inoperative during escapement. Contacts R30c (Fig. 8c) open, breaking the circuit of relay R33, so that it will not be in energized condition when the next punch cycle begins. Contacts R30f (Fig. 7) open, breaking the plate voltage supply to the J tubes and also the holding circuit for relays R20—R29. The relays R24—R20 are thereby deenergized, and the emitter is thus canceled. Contacts R30a (Fig. 8b) close, preparing a pick-up circuit for relay R31, the completion of which is subject to the series of contacts R20c, R21c ... R28c, R29c being all closed. When the relay R31a points close a holding circuit for it, its contacts R31d (Fig. 7) reconnect the plate voltage supply to the plates of the J tubes, and its R31b points (Fig. 8b) prepare a previously traced circuit by which relay R32 will be energized when the FC contacts close in column 53. When the card carriage arrives in column 53 and the FC contacts close, energizing relay R32, contacts R32c (Fig. 8c) transfer, again connecting the emitter output terminal 155 to the wire 230, which is now connected through the upper brush 64 with the column contact 62 for column 53. The contacts R32b (Fig. 8b) open, deenergizing relay R30, which allows contacts R30a to open, deenergizing relay R31. The deenergization of relay R30 also allows contacts R30b (Fig. 7) to close, restoring the emitter input circuit to operative condition, while the contacts R30f close before contacts R31d open, maintaining the voltage supply to the plate of the J tubes. The machine is now ready to respond to operation of the next key.

As shown by the example, this is to be the 0 key. When it is depressed, relays R9 (Fig. 8a)

and R13 and the 0 punch selector magnet are energized. The contacts R9b (Fig. 7) close, but do not affect the emitter. The eighth order counter, therefore, remains in 0 condition. The punch perforates the 0 index point position of column 53 and escapes to column 54. In the same manner each column of the left hand field of the card is punched in accordance with the successive digits of the first number of the problem. Whenever a key pertaining to a signicant digit is operated, the b contacts of the corresponding relay R1—R9 cause the related J tube of the emitter to be fired, with the result that an appropriate number of impulses are transmitted to the order of the accumulator connected to the emitter output terminal at the time.

When the card carriage escapes to column 61, the first column of field B, the upper brush 64 is again connected to wire 239 leading to the ninth order of the accumulator. The problem indicates that columns 61, 62 and 63 are to be blank. For each of these columns the operator depresses the space key. The resulting closure of the S contacts 55 (Fig. 8a) completes a circuit from bus wire 226, through normally closed contacts R36b, the bail contacts 58 now closed, bus bar 228, said contacts S, wire 241, punch magnet 30 to wire 221, energizing the punch magnet. Since no interposer 17 is shifted to the left, the downward movement of the depressor bar 18 of the punch (Fig. 1) has no effect upon the punches 10, but it does rock the shaft 41 and cause the escapement mechanism to operate.

The proper keys are operated in succession to punch each column of the middle field B of the card shown in Fig. 2. The values are concurrently added to the values already in the accumulator, in a manner to be described. In column 64, for example, the emitter transmits four impulses to the sixth order of the accumulator. In accordance with the problem, this order of the accumulator was left standing in a condition representing the number 2, after field A was punched. The four additional impulses transmitted to the sixth order counter, when the #4 key is operated in order to punch column 64, continue the progressive operation of the trigger circuits constituting this counter, so that when the fourth additional impulse has been received, stages A and B of the counter are in normal condition while stage C is switched to the left. Stage D remains switched to the left, to which condition it was changed by the second impulse of the first number entered.

Now considering column 69, a 4 is to be punched and this 4 is to be added to the 9 already entered in the first order of the accumulator. This involves a carry operation. When the first impulse, of the second digit to be added in this order, is transmitted from the emitter output terminal 155 (Fig. 8c), it continues through brush 64, the column contact 62 for column 69, and wire 231, to the input terminal 95 of the first order of the accumulator. This order, which stood in "9" condition, passes to normal condition representing a 0. The return of stage D to normal condition causes a negative impulse to be transmitted through the lead 117, through the right hand coupling condenser 94 of the carry trigger E, to the grid of tube E2. This tube is in conductive condition at this time and the negative impulse, therefore, switches the carry trigger E to the left. The potential on the plate of the tube E2 rises and the potential of the grid of the related tube F is raised accordingly, but not sufficiently high to make this tube conductive. The circuit, therefore, stands ready to transmit a carry impulse when the carry operate impulse is received, as described presently. The second, third, and fourth impulses transmitted in this column advance the first order counter to a state representing the value 3.

*Readout.*—When the machine entered the 69th column, lower brush 65 (Fig. 8c) completed the following circuit: from the bus wire 225, through contacts R35a in normal position, the lower brush 65, wire 242 (Figs. 8c and 8b), and relay R34 to the line 221, energizing said relay and initiating preparation of the readout control circuits. Contacts R34a close, preparing a circuit for relay R35 and the pickup coil of relay R36. These relays do not become energized upon closure of contacts R34a because they are shunted by wire 242 through the column 69 contacts 63 to the bus wire 225. When the machine spaces out of column 69, the shunting circuit just mentioned is opened when the lower brush 65 leaves the column 69 contact 63 and a circuit direct from bus wire 225, through R36P, R35 and R34 becomes effective to energize the relay coils R36P and R35 and to hold the relay coil R34 energized. The contacts R36a close, completing a holding circuit through the holding coil R36H of relay R36, directly from the line wire 220, through said holding coil, said contacts R36a, switch SW3b (now closed), resistance 249, to the line wire 221. Contacts R36b (Fig. 8a) open the circuit to the key contacts 55, removing the punch selector magnets and therefore the emitter from the control of the keys during readout, which is to follow. Contacts R35a (Fig. 8c) transfer, coupling the lower brush 65 through wire 178, condenser 175 and grid resistor 172 to the grid of tube M. Contacts R35b (Fig. 8b) open, preventing the relay R32 from becoming energized when the floating cam contacts FC close upon arrival of the carriage in column 70. Relays R30 and R31, which were energized when the card carriage escaped from column 69, therefore remain energized (since R32 is not energized) when the carriage arrives in column 70, contrary to their operation during adding. The emitter was canceled by the opening of contacts R36f (Fig. 7) and was then restored to ready condition by the closure of contacts R31d. Contacts R35c (Fig. 8b) close, completing a circuit from bus wire 225, through relay R37 to line wire 221, energizing said relay.

*Carry operate.*—Contacts R37a open (Fig. 8d) starting the carry operate sequence. The potential on the grid of tube G2, when the grid is disconnected from the negative bias wire 91, rises to a point which renders this tube conductive, thereby switching the trigger G to the right. The grid of tube H being connected to the plate of tube G2, its potential is depressed, cutting off this tube and causing the potential on wire 133 to rise. When this occurs, the tube F pertaining to any counter in which the carry trigger has switched to the left will be rendered conductive, depressing the potential at the related carry output terminal 126 and causing a negative impulse to be transmitted to the next higher order counter through the related wire 127. In accordance with the problem, a carry occurs when the carry operate impulse is imposed upon the grid of the tube F in the first order. The impulse transmitted through wire 127 to the second order causes this order to pass to 0 condition and to switch its carry trigger E. This raises the potential of the grid of the tube F for the second order counter and a carry impulse is thereupon transmitted through wire 127 from the second order to the third order counter. The accumulator now has stored in it the number 0401675903, which is the sum of the two numbers punched in fields A and B.

The carry operations occur with extreme rapidity in the course of the spacing of the carriage from column 69 to column 70 and are completed before the column readout brushes 64 and 65 make contact with the column contacts for column 70. When the relay R37 was energized in the manner described, the contacts R37d (Fig. 8b) closed to connect the relay R38 through contacts R38a in normal position to the floating cam contact bus 227, whereby as soon as the floating cam contacts close in column 70, relay R38 becomes energized. Its contacts R38a which, as indicated by the asterisk, are adjusted to make before break, transfer and hold the relay R38 on the control relay bus 225. Contacts R38b (Fig. 8d) open, removing negative bias potential from wire 118 and canceling all of the operated carry triggers E, that is, causing them to switch back to the right, if they have been switched to the left. The carry operate trigger remains switched to the right and maintains the preparatory potential on the grids of the F tubes. Contacts R38c (Fig. 8b) close, completing a circuit from the bus wire 225, through relay R39 to the line 221, energizing said relay. The points R39a (Fig. 8d) close, restoring the normal bias potential on wire 118.

Contacts R39b—R39e all change from their normal position, preparing various circuits which become operative during readout. These will be referred to individually in the course of the explanation of the readout operation. Contacts R39g (Fig. 8b) transfer, holding relay R30 through normally closed contacts R41a and contacts R30d, now closed. Contacts R39f close a circuit from bus wire 225, through contacts R30a now closed, said contacts R39f, contacts R31c now closed, relay R32 to line 221, energizing R32. The contacts R32c (Fig. 8c) transfer, connecting the emitter output terminal 155 to the upper brush 64 of the column readout mechanism. Contacts R32d (Fig. 8b) close, completing a circuit from bus wire 225, through contacts R30a, contacts R39h, both closed at this time, said contacts R32d and relay R40 to line 221, energizing R40. Contacts R40a close, completing an obvious circuit through the coil of relay R41, which becomes energized. Contacts R40b (Figs. 7 and 8c) close, connecting the +140 volt line 81 to a wire 243 leading to the grid of the #9 tube, initiating the sequential operation of all the J tubes and causing the related K tubes to be rendered conductive during successive time intervals.

Each time a K tube becomes conductive, the potential at the emitter output terminal 155 is depressed and this change of potential is transmitted through contacts R32c (Fig. 8c) in transferred position, the upper brush 64, the column contact 62 for column 70, wire 244, contacts R42c (Fig. 8a) in normal position to the input terminal of the tenth order counter of the accumulator. The trigger circuits of this counter go through their progressive changes as the impulses are transmitted from the emitter and, since in accordance with the example the tenth order of the accumulator stands at 0 when the read-out begins, all the pulses produced by the emitter are fed to this counter. While, as described later, the read-out of any significant digit in a counter steps it to zero whereupon a blocking impulse is produced which stops the step by step operation of the tubes J9, J8, etc. J0 (Fig. 7), when a zero stands in a counter, no such blocking impulse is required and all the J9 to J0 tubes are operated, the operation of the J0 tube indicating that zero stood in the counter prior to read out.

When all the relays R20—R29 (Fig. 7) have become energized, as a result of the firing of the related J tubes, they close their a contacts so that they are held on the +100 volt line 138. They also close their b contacts (Fig. 8a) and thereby select a circuit which in this case will cause the 0 punch selector magnet to be energized, as described presently.

When the relay R41 (Fig. 8b) is energized in the manner described above, the R41a points open, deenergizing the relay R30. The contacts R38a open, deenergizing the relays R31, R32, R40 and R41. The contacts R30e (Fig. 8a) close, completing the following circuit: from bus wire 226, through the floating cam contacts FC (the card carriage is still in column 70), wire 227, contacts R39b now closed, said contacts R30e, contacts R45a in normal position, normally closed contacts R47a, the contacts R28b—R29b all in transferred position, wires 59, and 49, relay R0, punch selector magnet 0 and relay R13 to line 221, energizing R0 and R13 and said punch selector magnet.

This initiates an operation of the punch to perforate the 0 index point position of column 70. The interposer pertaining to the 0 punch selector magnet is shifted and causes the contacts 38 to close, completing the circuit of punch magnet 30, which begins to energize. Meanwhile, the R13b (Fig. 8b) contacts close when relay R13 is energized, completing a circuit through the floating cam contacts FC, bus wire 227, contacts R39c and R13b now closed, and relay R30, to line 221, energizing said relay. Contacts R30h (Fig. 8a) close, completing a circuit from the punch contacts 38, through contacts R39d now closed, said contacts R30h, normally closed contacts R41b and R41c and relay R48, to wire 221, energizing R48. Contacts R48a close, completing a holding circuit for relay R48 from the bus wire 225 and also a parallel holding circuit for the punch magnet, through contacts R41b, R30h and R39d to the punch magnet 30 and line 221. This renders the energized condition of the punch magnet independent of the opening of the floating cam contacts FC and consequent deenergization of the punch selector magnet, thus assuring that the punch magnet will remain energized until the sequence of relays, now to be described, have completed their functions.

The energization of relay R30 causes contacts R30f (Fig. 7) to open, canceling the emitter, and contacts R30g (Fig. 8c) to open, deionizing the block impulse tube L. Contacts R28c—R29c close when their relay coils are deenergized. Contacts R30a (Fig. 8b) close, completing the previously traced circuit whereby relay R31 is energized. Contacts R31d (Fig. 7) and R31e (Fig. 8c) close, restoring the emitter and the block impulse tube L to ready condition. A circuit also extends through the closed contacts R39c and R13b (Fig. 8b), wire 247, contacts R47c and R42a, both in normal position, and relay R42 to line 221, energizing said relay. The contacts R42a, which are adjusted to make before break, transfer and hold the relay R42 on the control relay bus 225.

Contacts R42b (Fig. 8d) transfer, connecting the wire 245 (Fig. 8d) to the carry wire 127 from the ninth order of the accumulator. Contacts R42c transfer, connecting the input terminal 95 of the ninth order of the accumulator, through wire 244 (Figs. 8d and 8c) to the upper column contact 62 for column 70.

When relay R30 was energized, contacts R30e (Fig. 8a) opened the circuit from wire 227 said contacts R30e and, through the b contacts of relays R28—R20 to the relay R0, the punch selector magnet and relay R13. However, these relays and the punch selector magnet remain energized through the holding circuit from contacts FC, wire 227, through normally closed contacts R18b, bus bar 229, and contacts R0a.

When relay R31 was energized as described above, contacts R31c (Fig. 8b) closed, completing a circuit from the control relay bus 225, through contacts R30a, R39f, R31c, and relay R32 to line 221, energizing said relay. Contacts R32c transfer, connecting the output terminal 155 of the emitter to the upper brush 64 of the column readout mechanism. Contacts R32a (Fig. 8b) close, completing a previously traced circuit which in turn causes the energization of the relay R40. Contacts R40b (Fig. 7) close, extending the potential of the +140 volt line 81, through wire 243 and the resistor 143 to the grid of the #9 J tube and starting a new sequence of operations of the J tubes. The carriage is still in column 70 position but the b and c contacts of relay R42 (Fig. 8d) have transferred so that the emitter output terminal is now connected via contacts R42c, to the input terminal 95 of the ninth order of the accumulator, while the carry wire 127 from the ninth order has been connected through contacts R42b and wire 245, lower brush 65 of the column readout mechanism, contacts R35a in transferred position, and wire 178 to the input terminal 177 of the block impulse tube circuit.

Therefore, the impulses from the emitter at this time read out the ninth order accumulator, which contains a setting representing the digit 4. Thus, after six impulses a carry impulse from the ninth order counter transfers the carry trigger E in this order and since the F' tube is conditioned by the carry operate means all during read out this causes a negative impulse to be transmitted from the F' tube, through wire 127 and the circuit just traced to the input terminal 177 (Fig. 8c), a coupling condenser 175 and grid resistor 172 to the grid of the tube M. The potential on this grid is thereby lowered to the point where the tube becomes non-conductive and its plate potential rises to approximately +140 v., transmitting a positive pulse through coupling condenser 166 and grid resistor 170 to the grid of tube L, rendering it conductive. The potential of the plate of tube L drops and this drop has the function of a blocking impulse which is thereupon transmitted from tube L via line 158 (Fig. 7) to the shield grids of the J tubes, preventing the further sequential firing of these tubes. At this time only the #9-4 J tubes have fired. Their relays R29—R24 become energized, the a contacts of these relays close and hold them on wire 138, their c contacts (Fig. 8b) open the pickup circuit for relay R31, and their b contacts (Fig. 8a) transfer.

When relay R40 (Fig. 8b) was energized, its contacts R40a closed, picking up relay R41. Thereupon contacts R41a open, breaking the holding circuit of the A coil of relay R30. This may occur either before or after the floating cam contacts FC are opened by the operation of the punch magnet, deenergizing the B coil of the relay R30. When both coils of the relay R30 have been deenergized, the contacts R30e (Fig. 8a) close, but since the contacts FC are open at this time the circuit through the relay contacts R28b—R24b, transferred by the reading out of the ninth order of the accumulator, is not yet completed. The contacts R30a (Fig. 8b) open, deenergizing relays R31, R32, R40 and R41. When the card carriage arrives in column 71 and the floating cam contacts FC close, a circuit is completed through said contacts, bus wire 227, contacts R39b (Fig. 8a), R30e, R40a, in normal position, R41a, contacts R28b—R24b in transferred position, the related wires 59 and 49, relay R4, punch selector magnet 4, relay R14 to wire 221, energizing said relays and said punch selector magnet.

This initiates an operation of the punch to perforate the #4 index point position of column 71. Contacts R14b (Fig. 8b) close and pick up relay R30, which sets in motion a new sequence of operations of the relays and starts the emitter for reading out the eighth order of the accumulator. The card carriage being at this time in column 71, the output impulses from the emitter pass through contacts R32c (Fig. 8c) in transferred position, wire 230, upper brush 64, column contact 62 pertaining to column 71, wire 238 to the input terminal of the eighth order of the accumulator, the wire 238 being broken off and the eighth order of the accumulator not being shown in the drawing. The carry impulse from the eighth order of the accumulator is transmitted through carry wire 127 from the eighth order of the accumulator (Fig. 8d), contacts R42c in transferred position, wire 244 to the upper column contacts 62 of column 70, wire 248 to lower column contact 63 of column 71, brush 65, contacts R35a in transferred position, wire 178, coupling condenser 175, through resistor 172 to the grid of tube M, causing the block impulse to be impressed upon the shield grids of the J tubes. In accordance with the example, no block impulse is required and all of the J tubes have been fired; consequently, the contacts R28b—R20b all transfer and prepare a circuit to the 0 punch selector magnet 35. The 0 index point position of column 72 is subsequently perforated in the manner previously described for columns 70 and 71. The successive orders of the accumulator are read out in the same way and the digits 1, 6, 7, 5, 9, 0 and 3 are successively punched in columns 73—39. Field C then has been perforated to represent the sum of the numbers in fields A and B, namely 0,401,675,903.

When the #3 index point position is punched in column 79, the card is fed to column 80 position. This initiates a series of operations in which the finished card is ejected and a new card is automatically fed from the supply stack at the right side of the punch. This standard duplicating punch operation and the structure whereby the card ejection and card feed from the supply stack are accomplished have not been shown. Instead, reference will be made to the circuit diagram and to the Lee et al. Patent 1,976,618.

When the card carriage enters the 80th column position, the last column contacts 250 (Fig. 8b) are automatically closed (see Fig. 11 of said patent, contacts 191). This completes a circuit from wire 220, through said contacts and through the eject magnet 251 and the relay R18 in parallel to wire 221, energizing said magnet and said relay. The contacts R18a (Fig. 8a) open, disconnecting the control relay bus 225 from the line and dropping out all of the control relays which are being held on that bus wire at the time. This includes relay R37, whose contacts R37a (Fig. 8d) close, restoring negative bias potential to the grid of tube G2, but without reversing the trigger G. Only the relay R36 (Fig. 8b) remains energized through a circuit extending from wire 220, the holding coil R36H of said relay, contacts R36a, switch SW3b, now closed, and resistor 249 to line 221. The contacts R36b (Fig. 8a) remain open, disconnecting the bus bar 228 of the keyboard from the potential supply. When relay R16 is deenergized, its contacts R16a (Fig. 7) open, disconnecting the +100 volt line 138 from the plates of the J tubes and canceling the emitter. The deenergization of relay R17 allows its contacts R17a (Fig. 8b) to open, disconnecting the negative bias supply from the wires 93 and 118 and thereby canceling the counters, the carry triggers E and the carry operate trigger G, and since line 178 is no longer negative the block impulse tube L.

When the card is ejected in the manner described in the Lee et al. patent, the auto start contacts 252 close, and the trip magnet 253 (Fig. 8b) is energized (see contacts 201, Fig. 17, and magnet 175, Fig. 1, of said patent). The trip magnet engages a clutch (clutch 167 in said patent) to mechanically connect the card carriage to a carriage return motor 254 (Fig. 8a) (motor 157 in said patent) and transfers the latch contacts 224 (contacts 136, 190 in said patent). The transfer of the latch contacts supplies current to the motor 254 and provides an additional break between the voltage supply and the bus wires 225, 226 and 227. At the end of the carriage movement by which a new card is delivered by a card picker (picker 2 in said patent) from the stack to the pusher 13 (Fig. 3), the latch contacts 224 are transferred back to their normal position as described in said patent, restoring the voltage supply to the bus wire 225, relay R18 (Fig. 8b) having become deenergized meanwhile by the opening of contacts 250. The relay R16 is again energized, its contacts R16b close and relay R17 is thereby reenergized. The contacts R16a (Fig. 7) close, supplying voltage again to the plates of the J tubes. The contacts R17a (Fig. 18d) close, restoring the cancel circuits. The contacts R17b close (Fig. 8a) restoring voltage to wire 226. The contacts R17c close, preparing a circuit to be mentioned presently.

The skip bar previously described causes the new card to be fed by the card carriage immediately to column 52. When it reaches this position, the lower brush 65 (Fig. 8c) engages the column 52 contact, completing the following circuit: from bus wire 225, through contacts R35a in normal position, lower brush 65, the lower column contact for column 52, wire 255 (Figs. 8c and 8b), contacts R17c now closed, contacts R36a, switch SW3b, resistor 249 to wire 221. This shunts out the holding coil R36H, which becomes deenergized, allowing its contacts R36a to open and breaking the shunting circuit just described. The contacts R36b (Fig. 8a) close, supplying voltage to the keyboard bus bar 228. The relay R36 thus not only disables the keyboard during readout and card feed but also insures that the card is in column 52 before the keyboard can be operated again. The operation of the other control circuits by which the machine is prepared for punching the new card is the same as described for the first card.

SUBTRACTION

Means are provided whereby a smaller number can be punched in either field A, or field B, and subtracted from a larger number entered in field B, or field A, the positive difference then being automatically punched in field C. To illustrate this operation, it will be explained how the number 241 can be subtracted from the number 483 and the difference, 242, punched in field C. It will be assumed, first, that the subtrahend is to be punched in field A and the minuend 483 in field B. With a new card in column 52 position and the machine ready for operation, the subtraction key 260 (Fig. 8b) is depressed, completing an obvious circuit from bus wire 225, through relay R43 to wire 221 and energizing said relay. Contacts R43a close, extending a holding circuit for relay R43 through normally closed contacts R37c, contacts R46b in normal position, to bus wire 225. Contacts R43b (Fig. 8c) close, to add an elusive one to the first order of the accumulator. A small condenser 261 is normally connected between the +140 volt line 81 by wire 262 and, through the contacts R43b in normal position, to wire 263 (Figs. 8c and 8d) connected to the intermediate point 192 of voltage divider 193, 194, so as to be maintained at +115 volts. Thus, the condenser 261 normally has a −25 volt charge. When contacts R43b transfer, a negative impulse is transmitted through normally closed contacts R44a and wire 264 to the input terminal 95 of the first order of the accumulator, adding 1 in this order.

Contacts R43c (Fig. 8b) close at the time the negative impulse is transmitted, extending a circuit from bus wire 225, through relay R44, to wire 221, energizing said relay. Contacts R44a open the elusive 1 circuit to wire 264 and prepare the first order of the accumulator for normal reading. Contacts R44b to R44j (Fig. 8c) transfer, reversing the connections of the contacts R0b—R9b to the emitter input wires 144. Through the wires 265, the contacts R0b—R9b are connected to the wires 144, in such a way, as to trip the J tubes so as to enter the 9's complements of the digits represented by the keys punched. Contacts R44k (Fig. 8b) close, extending a circuit from bus wire 225, through relay R45 to wire 221, energizing said relay. Contacts R45b close, holding relay R45, through normally closed contacts R47b, on the bus wire 225. The function of the relay R45 will be discussed presently.

The machine is now in condition for operation of the keys to punch field A to represent the value of the subtrahend, namely, number 241. The 0 key is operated six times, causing the carriage to move to column 58. Each time the 0 contacts 55 close, the punch is operated to perforate the 0 index point, while the relay R0 is energized, closing its R0b contacts (Fig. 7) and firing the #9 J tube, contacts R44j being in transferred position. Thus, nine impulses are transmitted to each of those orders of the accumulator, beginning with the 9th order and including the 4th order.

In columns 58, 59 and 60 the digits 2, 4, and 1 are to be punched while the 9's complements of those digits are added to the third, second and first orders of the accumulator. This is accomplished by operation of the 2, 4 and 1 keys in succession, which due to the reverse connections between the *b* contacts of the key relays R1—R9 and the emitter input wires 144, trip the 7, 5, and 8 J tubes of the emitter in succession, to cause a corresponding number of impulses to be transmitted to the accumulator counters of the third, second, and first orders.

When the card carriage enters column 60, a circuit is extended from bus wire 225, through contacts R35a in normal position, lower brush 65, the lower column contact, wire 256 (Figs. 8c and 8b) and relay R46 to wire 221, energizing said relay. Contacts R46b transfer. These contacts being adjusted to make before break, the holding circuit for relay R44 is extended through contacts R44m now closed, and through contacts R46b in transferred position. The holding circuit of relay R43 is broken by the transfer of contacts R46b, deenergizing relay R43. Contacts R43a and R43c open and contacts R43b (Fig. 8c) go back to normal position. When the card carriage escapes from column 60, after this column has been punched, relay R46 drops out, contacts R46b return to normal position, and relay R44 is deenergized, restoring the circuits to normal adding condition.

The accumulator now contains the number 0999999759. In the first six columns of field B the operator may either depress the space key six times or the 0 key. In the former case, the card carriage will simply move six spaces without the card being perforated, while in the latter case six 0's will be perforated in columns 61 to 66. In columns 67, 68 and 69 the digits 4, 8 and 3 are to be perforated. Entry of a corresponding number of impulses in the third, second and first orders of the accumulator will advance each of these orders through 0, leaving the third order at 1, the second order at 3 and the first order at 2. The carry triggers E of each of these orders will be switched to the left. When the card carriage spaces out of column 69, the carry sequence will be initiated in the manner previously described. Relay R35 (Fig. 8b) is picked up and its contacts R35b open, preventing relay R32 from being energized when the FC contacts close in column 70 and thereby preventing relay R30 from being deenergized at that time. Contacts R35c close, picking up relay R37. The contacts R37a (Fig. 8d) open, causing carry operating potential to be applied through wire 133 to the grids of each of the F tubes. Since each of the carry triggers E of the first, second and third orders has been switched to the left, the F tubes pertaining to these orders are in condition to transmit a carry impulse to the next higher order when the carry operating potential is applied to their grids. Furthermore, the carry impulse transmitted from the third order to the fourth order restores the fourth order to 0 condition, causing its carry trigger E to be switched to the left and the carry impulse to be transmitted to the fifth order of the accumulator. Since the fifth to ninth orders of the accumulator stand at 9, the carry impulse is transmitted right through to the tenth order, which is advanced to 1. The accumulator now stands in a condition representing the number 1000000242. This is the correct difference, except for the one in the tenth order. To correct the accumulator before reading out the difference, provision is made to add nine impulses in this tenth order, in a manner now to be described.

The R37d contacts close and prepare a circuit through which relay R38 is energized when the FC contacts close in column 70. Contacts R38b (Fig. 8d) cancel the carry trigger while contacts R38c (Fig. 8b) pick up relay R39. The latter relay prepares a number of control circuits for readout, as previously described. Its *f* contacts complete a circuit through which relay R32 is energized and the *c* contacts of relay R32 (Fig. 8c) connect the emitter output terminal 155 to the upper brush 64 of the column readout mechanism then in column 70. When contacts R32d (Fig. 8b) close, relay R40 picks up and its *b* contacts (Fig. 7) cause the #9 J tube to be fired. The resulting nine impulses from the emitter are transmitted from column 70 through wire 244 (Figs. 8c and 8d) and contacts R42c in normal position, to the tenth order counter, advancing the latter to 0 condition. The relays R20—R29 are all energized, but this is without significance as will be explained.

When contacts R40a (Fig. 8b) close, relay R41 is energized and its *a* contacts break the holding circuit of relay R30, which becomes deenergized. It was previously described how relay R45 was picked up by a circuit completed by the *k* contacts of relay R44 and held on bus wire 225, through normally closed contacts R47b. Consequently, when the contacts R30e (Fig. 8a) close, a circuit is extended from bus wire 227, through previously closed contacts R39b, contacts R30e, contacts R45a in transferred position, and relay R47, to wire 221, energizing said relay. Contacts R47d close, completing a holding circuit for relay R47 through contacts R30e and R39b to the bus wire 227. Contacts R47a open, disconnecting the lead to the punch selector magnets. Contacts R47b (Fig. 8b) open, dropping out relay R45 and allowing contacts R45a (Fig. 8a) to return to normal position. Contacts R47c (Fig. 8b) transfer, closing a pickup circuit to relay R30, which becomes energized, opening its *e* points and dropping out relay R47.

Thus, the emitter has been run through one cycle, feeding nine impulses to the tenth order counter, but no punching circuits have been energized, relay R42 has not been picked up, and the card carriage remains in column 70. The accumulator now represents the number 0000000242, which is the correct difference. The energization of relay R30 through contacts R47c initiates a readout sequence, which proceeds exactly as described before. Contacts R30f open, canceling the unused setting of the emitter, while contacts R30g deionize the block impulse tube L. Potential is thereupon restored to the emitter J tubes and the tube L by contacts R31d and R31e, when relay R31 picks up.

If the minuend is to be entered in field A instead of field B, as above, and the subtrahend in field B instead of field A, as above, the sequence of operations will be the same with the following exceptions:

The subtract key 260 will be operated when the card reaches column 61, with the same result as previously described. When the card carriage spaces out of column 69, relays R35 and R37 (Fig. 8b) pick up in succession and contacts R37c break the holding circuit of relay R43. Relay R44 is deenergized as contacts R43c open and the circuits are restored to the condition for readout following subtraction.

While there have been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device of the class described, a digit registering stage comprising electronic discharge elements interconnected so as to be operated in a certain order in response to electrical counting impulses to register a digit therein, readout means comprising a plurality of emitter units, each unit comprising an electronic discharge device having an anode and a cathode connected in an output circuit, and at least two control electrodes, means coupling the output circuit of each device, except one, to one of the control electrodes of a neighboring device to form a chain, each coupling means including time delay means whereby said emitter units operate automatically in sequence when the first emitter unit in the chain is caused to operate, means controlled by said emitter units for transmitting a counting impulse to said counting stage as each emitter unit is operated, a terminal device operated in response to the operation of said counting stage, blocking means operated by said terminal device and coupled to all of the second control electrodes of said emitter units so as to impart a cutoff bias thereto when said blocking means is operated, to stop the sequential operation of said chain of emitter units, manifesting means and means selectively controlled by said emitter units to render said manifesting means operative to manifest the digit registered by said registering stage.

2. In combination with an accumulator comprising a plurality of series of counting stages, each series having an input lead and the stages of each series being interconnected so as to operate in a certain order, in response to electrical operating impulses applied to the related input lead, a set of normally inoperative emitter units individually representing different digit values and operatively connected in a chain so that operation of any one of said emitter units will cause the unit of the next lower digit value to operate after a definite time interval, an output lead, means controlled by the individual emitter units to impress an operating impulse on said output lead each time an emitter unit is operated, means for automatically connecting said output lead of the emitter chain successively to the input leads of the different series of counting stages, means to initiate an operation of the emitter unit of highest digit value each time said output lead is connected to a different input lead, terminal means associated with each series of counting stages and controlled by a particular counting stage in the related series, means controlled by said terminal means to stop the sequential operation of the chain of emitter units, digit manifesting means and means selectively controlled by said emitter units to control said manifesting means in accordance with the operated units so as to manifest the digit represented by the emitter unit last operated at the time the emitter chain is stopped, and means to restore the emitter chain to normal condition each time the output lead of the emitter chain is transferred to a different input lead.

3. In combination with a series of counting stages each having an input lead and interconnected so as to be operated in a certain order in response to electrical operating impulses applied to said input leads; a set of normally inoperative emitter units individually representing different digit values and operatively connected in a chain so that operation of any one of said emitter units will cause the unit of next lower digit value to operate after a definite time interval, means for selectively initiating an operation of any one of said emitter units, and means including an output lead controlled by the individual emitter units to impress an operating impulse on a selected input lead each time a unit is operated, and readout means including means to selectively connect said output lead to said input leads, means to initiate an operation of the emitter unit of highest digit value, terminal means controlled by the selected counting stage, means controlled by said terminal means to stop the sequential operation of said chain of emitter units, and means to restore said emitter chain to normal condition each time the output lead of the emitter chain is selectively connected to a different input lead.

4. In combination, an electronic counter comprising a series of electronic networks each including an electronic device, means for selectively changing the electrical status of said networks in response to entered values, each entered value having a corresponding electrical status; and step by step operated sending and receiving means sending energy changes to said counter to electronically beat said series of networks with electrical manifestations and receiving an energy change back from said counter to thereby produce an electrical manifestation to stop said beating means at a step, individually representative of the particular status assumed by said counter upon initiation of said beating.

5. In combination, an electronic counter comprising a chain of electronic trigger circuits, each trigger operable to either of two stable electrical conditions, means for setting said triggers to permutations of either of said stable conditions, each permutation indicative of an entered value, and electronic readout means for producing within said readout means an electrical effect representative of the particular permutation assumed by said counter, said readout means comprising a source of electronic energy changes, means for applying said energy changes to said counter to alter the settings of said triggers and means rendered effective upon said counter assuming a chosen permutation of said settings for controlling said source to limit the number of said energy changes to a number bearing a selected relation to the value entered in said counter to thereby produce in said readout means an effect indicative of said particular value.

6. In combination, a plurality of circuits each including an electron emission device, each circuit operable by energy changes to assume either of two sustained electrical conditions, a source of electrical energy changes, means for selectively applying said energy changes to said circuits in proportion to a value to be entered whereby said circuit assumes a permutation of sustained electrical conditions indicative of said entered digit, electronic step by step operative means including said energy change source producing a series of pulses electronically beating said circuits to progress them through a course of different permutations and means effective upon assumption by said circuit of a chosen permutation to render said energy change source inoperative to stop said electronic means at a certain step in its operation to thereby produce in said electronic means an indication of said entered value.

7. In combination, an emitter comprising a plurality of electronic devices, means for causing said devices to operate in sequence, means to produce a first operation of said emitter and to selectively determine the number of said electronic devices to be operated, an electronic counter, means coupling said emitter and counter whereby the number of devices operated in said emitter produces a corresponding electrical value manifestation in said counter, means operative to decouple said emitter and counter and to reset said emitter to a chosen status, means recoupling said emitter and counter, and means thereupon operative to initiate a second operation of said emitter to read out the value entered in said counter.

8. In combination, an emitter comprising a plurality of electronic devices, means for causing said devices to operate in sequence, each such operation producing an energy change and the last device so operated indicating a digit value, an electronic counter comprising a plurality of electronic circuits, each operable to either of two sustained electrical conditions, the different permutations of said conditions being respectively indicative of different entered values, means coupling said emitter and counter, means resetting said emitter and then initiating operation of said emitter whereby said energy changes are applied to said counter to read out the value entered in said counter and means rendered operative upon assumption of a chosen permutation of such conditions by said counter to stop operation of said emitter, the last electronic device operated in said emitter producing an indication of the value read out of said counter.

9. In combination, an emitter comprising a plurality of electronic devices, means for causing said devices to operate in sequence, an electronic counter comprising a plurality of electronic circuits each operable to either of two sustained electrical conditions, the different permutations of said conditions being respectively indicative of a different entered digit, means coupling said emitter and counter, means resetting said emitter and then initiating operation thereof, and means rendered operative upon passage of said counter to a chosen permutation selected as its reset condition to render said emitter inoperative whereby said counter is stopped in said reset condition.

10. In combination, an emitter comprising a plurality of electronic devices, means for causing said devices to operate in sequence, means to produce a first operation of said emitter and to selectively determine the number of said electronic devices to be operated, an electronic counter operable to a plurality of electrical conditions each respectively representative of one of the values 0 to 9, inclusive, means coupling said emitter and counter whereby the number of tubes operated in said emitter produces a corresponding electrical digit representing condition in said counter, readout means including means operative to decouple said emitter and counter and to reset said emitter to a chosen status, means recoupling said emitter and counter and means thereupon operative to initiate a second operation of said emitter and means responsive when said counter passes to 0 condition to stop operation of said emitter, the last tube operated therein producing an indication of that digit standing in said counter upon initiation of readout.

11. In combination, an emitter comprising a plurality of electronic devices, means for causing said devices to operate in sequence, means to produce a first operation of said emitter and to selectively determine the number of said electronic devices to be operated, an electronic counter operable to a plurality of electrical conditions each respectively representative of one of the values 0 to 9, inclusive, means coupling said emitter and counter whereby the number of tubes operated in said emitter produces a corresponding electrical digit representing condition in said counter, readout means including means operative to decouple said emitter and counter and reset said emitter to a chosen status, means recoupling said emitter and counter and means thereupon operative to initiate a second operation of said emitter, and means responsive when said counter passes to 0 condition to stop operation of said emitter and of said counter, whereby said counter is reset to 0 and the last tube operated in said emitter produces an indication of the digit entered in said counter upon initiation of said readout.

12. In combination, an electronic counter comprising a plurality of electronic circuits, each operable to either of two sustained electrical conditions, said circuits being sequentially operated in steps upon application of energy changes to said counter, the permutations of said conditions, at any time, respectively indicating a value initially entered in said counter at that time, means for initiating roll-out of said first counter and comprising a source of electrical energy changes, means applying said energy changes to said counter, in steps, to step said counter through a series of permutations, from that permutation indicative of an entered digit to a second chosen permutation elected as a norm, and means effective in proportion to the number of steps required to reset said first counter to its chosen norm to produce a control effect directly proportional to said number of steps.

RALPH L. PALMER.
BYRON E. PHELPS.

REFERENCES CITED

The following references are of record in the file of this patent:

UNITED STATES PATENTS

| Number | Name | Date |
| --- | --- | --- |
| 1,866,995 | Bryce | July 12, 1932 |
| 1,880,422 | Daly et al. | Oct. 4, 1932 |
| 2,156,969 | Bryce | May 2, 1939 |
| 2,158,285 | Koch | May 16, 1939 |
| 2,170,543 | Bryce | Aug. 22, 1939 |
| 2,342,753 | Pearson et al. | Feb. 29, 1944 |
| 2,373,134 | Massonneau | Apr. 10, 1945 |
| 2,398,771 | Compton | Apr. 23, 1946 |
| 2,402,988 | Dickinson | July 2, 1946 |
| 2,418,521 | Morton | Apr. 8, 1947 |
| 2,442,428 | Mumma | June 1, 1948 |

OTHER REFERENCES

"A Four Tube Counter Decade," Potter, pp. 110–113, 358, 359 and 360, June 1944 issue of Electronics.